United States Patent [19]

Sensui et al.

[11] Patent Number: 5,796,517
[45] Date of Patent: Aug. 18, 1998

[54] INNER FOCUS TYPE TELESCOPE

[75] Inventors: Takayuki Sensui; Takayuki Ito; Hirofumi Matsuo; Satoru Nakamura; Tatsuo Goto; Yasuo Nakamura, all of Tokyo, Japan

[73] Assignees: Asahi Seimitsu Kabushiki Kaisha; Asahi Kogaku Kogyo Kabushiki Kaisha, both of Tokyo, Japan

[21] Appl. No.: 878,671

[22] Filed: Jun. 20, 1997

Related U.S. Application Data

[63] Continuation of Ser. No. 579,240, Dec. 28, 1995, abandoned.

[30] Foreign Application Priority Data

Dec. 28, 1994 [JP] Japan .................................. 6-328786
Jul. 25, 1995 [JP] Japan .................................. 7-189506

[51] Int. Cl.⁶ .......................... G02B 23/04; G01B 9/06; G01B 11/14
[52] U.S. Cl. .......................... 359/426; 359/431; 359/556; 356/375
[58] Field of Search .................. 359/426, 425, 359/427, 431, 429, 430, 399, 400, 401, 556; 250/201.8; 356/375

[56] References Cited

U.S. PATENT DOCUMENTS

| | | | |
|---|---|---|---|
| 1,616,660 | 2/1927 | Henderson | 359/556 |
| 3,475,074 | 10/1969 | Humphrey | 359/556 |
| 3,582,179 | 6/1971 | Nakazawa | 359/556 |
| 3,608,996 | 9/1971 | Humphrey | 359/556 |
| 4,260,218 | 4/1981 | Gullicksen et al. | 359/556 |
| 4,262,988 | 4/1981 | Ishibai et al. | 359/418 |
| 4,293,187 | 10/1981 | Ishibai et al. | 359/418 |
| 4,620,092 | 10/1986 | Hara | |
| 4,650,297 | 3/1987 | Ishibai | 359/426 |
| 4,682,218 | 7/1987 | Kaneko | |
| 4,702,008 | 10/1987 | Suzuki et al. | |
| 4,890,132 | 12/1989 | Hama | |
| 4,893,145 | 1/1990 | Matsuda | |
| 4,983,033 | 1/1991 | Suzuki | |
| 5,087,125 | 2/1992 | Narutakai et al. | 356/375 |
| 5,126,549 | 6/1992 | Yamada | 359/407 |
| 5,216,480 | 6/1993 | Kaneko et al. | |
| 5,235,445 | 8/1993 | Akagi et al. | 359/416 |
| 5,239,417 | 8/1993 | Eguchi et al. | |
| 5,311,354 | 5/1994 | Kamiya et al. | 359/399 |
| 5,597,999 | 1/1997 | Kinba et al. | 250/201.8 |

FOREIGN PATENT DOCUMENTS

52-7746  1/1977  Japan .................................. 359/381

*Primary Examiner*—Jon W. Henry
*Attorney, Agent, or Firm*—Greenblum & Bernstein P.L.C.

[57] ABSTRACT

An inner focus type telescope includes a sighting objective lens, a focusing lens, a horizon compensating optical system, a focal plane, and an eyepiece through which an object image formed on the focal plane can be viewed, arranged in this order from the object side. The position of the focusing lens is adjustable to form the object image on the focal plane in accordance with the distance of an object to be viewed. The telescope further includes a beam splitting optical system provided in the optical path between the objective lens and the focal plane to split the optical path, a surface equivalent to the focal plane, provided in the beam splitting optical system, and a focus detecting system which detects the state of the focus at the equivalent surface.

25 Claims, 21 Drawing Sheets

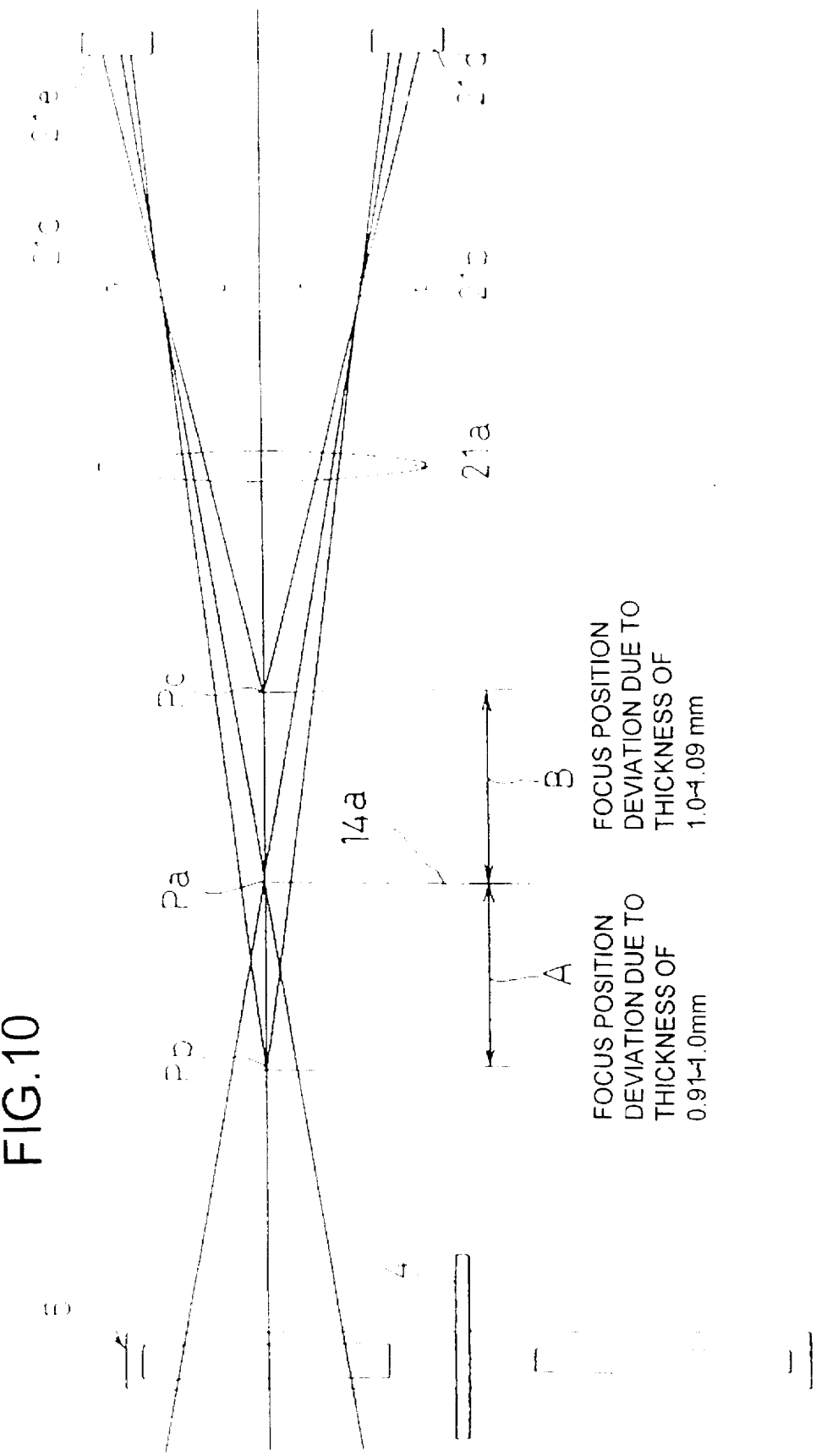

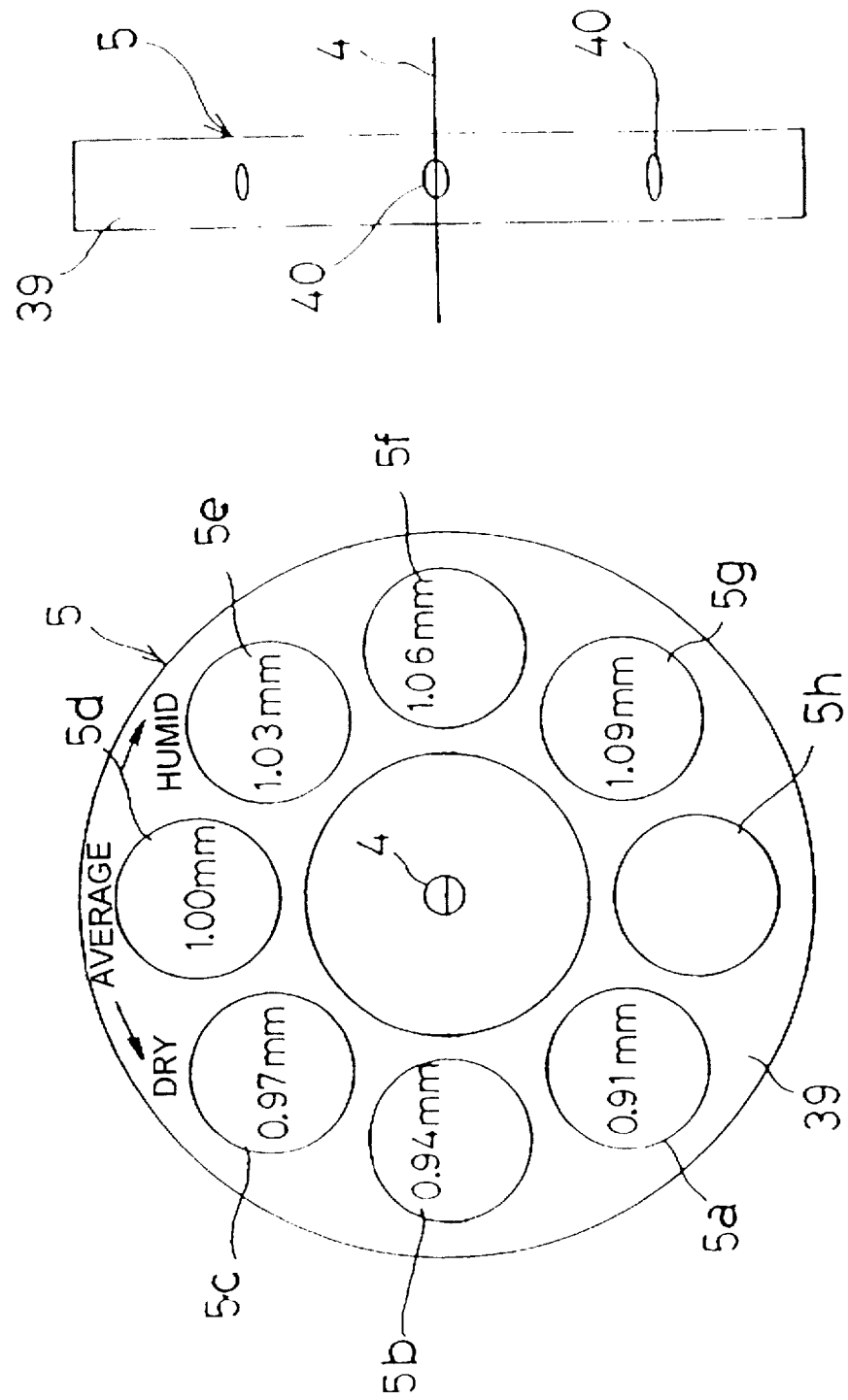

INNER FOCUS TYPE TELESCOPE

This application is a continuation of application Ser. No. 08/579,240, filed Dec. 28, 1995, now abandoned.

BACKGROUND OF THE INVENTION

1. Field of the Invention

The present invention relates to an inner focus type telescope which can be used, for example, in an automatic level (self-leveling level) which sights a reference position along a horizontal plane. The horizontal plane includes the reference position.

2. Description of the Related Art

An automatic level basically comprises a sighting telescope and a horizontal compensating optical system. When a reference position is sighted by the sighting telescope, which is set in a substantially horizontal position, the horizon compensating optical system ensures that the sighting line extends in a horizontal direction, even if the optical axis of the telescope is not correctly positioned in the horizontal plane. When a sighting point is sighted after the telescope has been rotated about the vertical axis, perpendicular to the optical axis thereof, the sighting point is located in the horizontal plane including the reference position.

In such an automatic level, a focusing lens is provided so that a clear image of a sighted object can be viewed, regardless of the object distance. Namely, the telescope of the automatic level comprises an objective lens, the focusing lens, and an eyepiece, arranged in this order from the object side. The position of the focusing lens is adjusted, depending on the object distance, so as to form the object image on the focal plane. The object image as formed on the focal plane can be viewed through the eyepiece.

Assuming that the object distance range of the sighting telescope is for example, 0.2 m to ∞, and the focusing lens is a concave lens, the movement of the focusing lens is around 30 mm. This movement of the focusing lens is usually achieved by rotation of a rotatable knob. If the movement of the object image (i.e., the movement of the focusing lens) relative to the angular displacement of the rotatable knob is small, it takes a long time to move the lens to a predetermined position, and the image remains on the focal plane for a long period of time, with respect to the angular displacement of the knob. Conversely, if the movement of the object image relative to the angular displacement of the rotatable knob is large, the time in which the image remains on the focal plane is too short, with respect to the angular displacement of the knob. Moreover, the object image is sometimes moved to a position beyond the focal plane, thus making a time consuming readjustment necessary. Furthermore, when the object (i.e., point) to be sighted is located far away, focusing can be carried out by a slight rotation of the rotatable knob, but, when the object is located at a close distance, it takes a long time to move the object image to the focal plane by rotation of the rotatable knob. In addition to the foregoing, since it is impossible to check whether the object to be viewed is in a front focus state or rear focus state, there is a possibility that the rotatable knob will be rotated in a wrong direction, i.e., opposite to the focusing direction. In any event, in the conventional automatic level, the focusing operation requires a long time.

SUMMARY OF THE INVENTION

To eliminate the drawbacks of the conventional automatic level as mentioned above, it is an object of the present invention to provide an improved inner focus type telescope in which the time it takes to focus can be shortened.

Another object of the present invention is to provide an inner focus type telescope in which automatic focusing can be appropriately effected regardless of external factors, such as an ambient moisture, etc., upon measurement using the automatic level, so that a clear, focused object image can be viewed.

To achieve the objects mentioned above, according to the present invention, there is provided an inner focus type telescope comprising a sighting objective lens, a focusing lens, a horizon compensating optical system, a focal plane, and an eyepiece through which an object image formed on the focal plane can be viewed, arranged in this order from the object side. The position of the focusing lens is adjustable to form the object image on the focal plane in accordance with the distance of an object to be sighted. The telescope further comprises a beam splitting optical system provided in the optical path between the objective lens and the focal plane to split the optical path, a surface equivalent to the focal plane, provided in the beam splitting optical system, and a focus detecting system which detects the state of the focus at the equivalent surface.

With the output of the focus detecting system, the time necessary for the focusing operation can be reduced. For instance, an indicator which indicates the front focus or rear focus is actuated in accordance with the output of the focus detecting system, so that the direction of the movement of the focusing lens can be indicated.

To automate the focusing operation, a driving system is preferably provided for driving the focusing lens in accordance with the output of the focus detecting system. In this connection, preferably, a mode switching device is provided for selecting an autofocus mode in which the focusing lens is driven in accordance with the output of the focus detecting system, or a manual mode in which the focusing lens is manually driven regardless of the output of the focus detecting system.

The inventors of the present invention have found the optimum position of the beam splitting optical system. Namely, the beam splitting optical system is provided between the horizon compensating optical system and the focal plane to obtain the best result.

With this arrangement, since the beam splitting optical system splits the horizontal rays of light emitted from the horizon compensating optical system, an object image on the focal plane, which can be viewed by an operator through the eyepiece, is identical to a conjugate image whose focus is to be adjusted. Namely, in the inner focus type telescope, the light within the horizontal plane can be sighted even if the optical axis of the sighting telescope is not correctly horizontal. Thus the beam splitting optical system is provided in front of the horizon compensating optical system, the deviation of the object image, which is actually observed, and the conjugate image thereof used to adjust the focus would increase as the deviation of the optical axis of the sighting telescope from the horizontal increases. It goes without saying that if the beam splitting optical system is provided in front of the horizon compensating optical system, focus data can be obtained, to some extent. Nevertheless, if the beam splitting optical system is provided between the compensating mirror of the horizon compensating optical system and the focal plane, focus data of the object image which is actually observed can be obtained, thus resulting in a more precise focus adjustment.

The horizon compensating optical system can comprise of a first compensating prism, a compensating mirror, and a second compensating prism.

The beam splitting optical system can comprise a beam splitting element which is adhered to any one of the first compensating prism and the second compensating prism to facilitate the operation of the device. In the most preferable embodiment, the beam splitting element is adhered to a light emission surface of an optical element behind the compensating mirror (e.g., on the light emission surface of the second compensating prism).

The present invention also proposes an inner focus type telescope in which an automatic focusing operation can be correctly carried out independently of the external factors affecting measurement.

Namely, according to another aspect of the present invention, an inner focus type telescope further comprises a correcting device for correcting an optical positional deviation between the focal plane and the equivalent surface, whereby the focus can be automatically and correctly adjusted. The correcting device can comprise an adjusting optical member which moves the light convergent point of the beam splitting optical system onto the equivalent surface. Preferably, the adjusting optical member comprises a plurality of transparent plane-parallel plates having successively different thicknesses, that can be selectively brought into the optical path of the beam splitting optical system.

The adjusting optical member is rotatably supported and is provided, on the portion surrounding the center of rotation thereof, with the transparent plane-parallel plates which are spaced at an equi-angular distance. The plane-parallel plates can be selectively brought into the optical path of the beam splitting optical system by rotating the adjusting optical member.

As an alternative, the correcting device can comprise a movement adjusting device for moving the focus detecting system relative to the equivalent surface. An operating portion of the correcting device can be provided with an operation knob which can be manually actuated, and a dial which is provided about the operation knob to represent the successive displacements of the focus detecting system depending on an external factor including an ambient moisture, affecting measurement.

According to another aspect of the present invention, in an inner focus type telescope, the focus detecting system can comprise a pair of imaging lenses spaced at a distance identical to the base length, and a pair of line sensors in which the object images are formed by the imaging lenses. One of the line sensors is provided with a first reference area to obtain a first reference output, and the other line sensor is provided with a second reference area to obtain a second reference output. Thus the deviation of the light convergent point of the sighting optical system having the sighting objective lens and the focusing lens, from the equivalent surface can be detected by a phase difference detection method, based on the reference outputs.

In another alternative of the correcting device, the correcting device selects a group of light receiving elements which defines the second reference area from a large number of light receiving elements which constitute one of the line sensors, while fixing a group of light receiving elements which defines the first reference area selected from among a large number of light receiving elements that constitute the other line sensor, to thereby vary the center address of the second reference area.

If a battery box, in which a battery is received in a fluid tight fashion is provided, an operating portion to actuate the correcting device can be provided in the battery box.

The present disclosure relates to subject matter contained in Japanese patent application No. 6-328786 (filed on Dec. 28, 1994) and Japanese patent application No. 7-189506 (filed on Jul. 25, 1995) which are expressly incorporated herein by reference in their entirety.

BRIEF DESCRIPTION OF THE DRAWINGS

The invention will be described below in detail with reference to the accompanying drawings, in which:

FIG. 10 is a schematic view of a beam splitting optical system having an adjusting optical element inserted therein, in an automatic level including an optical user offset function;

FIG. 11 is a front elevational view of the adjusting optical element shown in FIG. 10;

FIG. 12 is a side elevational view of the adjusting optical element shown in FIG. 10;

DESCRIPTION OF THE PREFERRED EMBODIMENT

Figure 8:
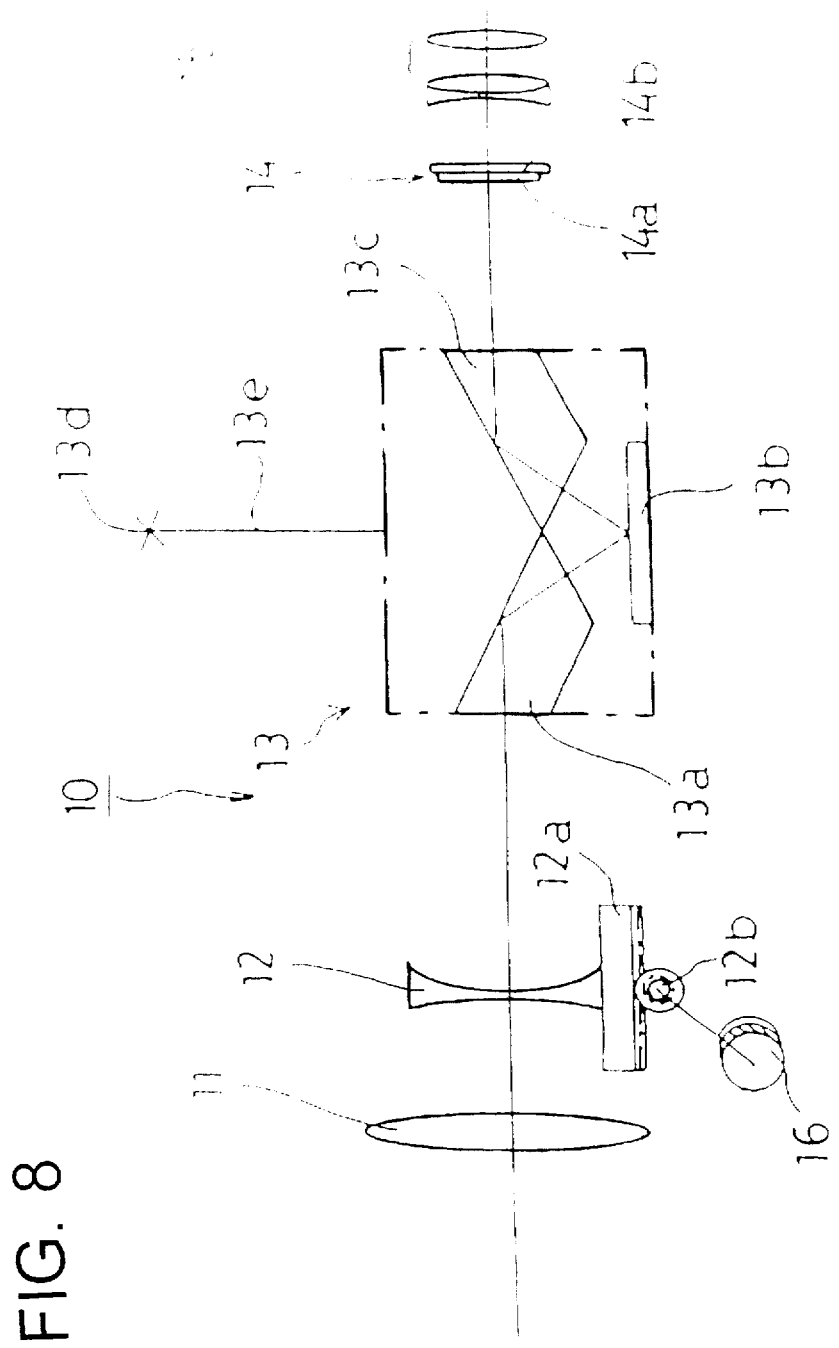
FIG. 8 is a conceptual view of the principle of an automatic level.
Figure 9:
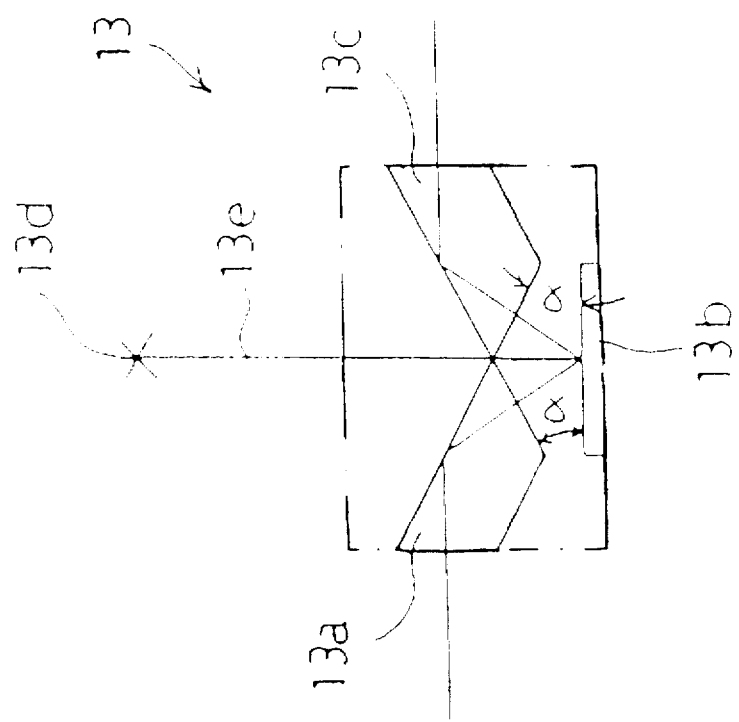
FIG. 9 is a schematic view of a horizontal compensating optical system of an automatic level.

In the illustrated embodiments, the present invention is applied to an automatic level which is generally constructed as shown in FIGS. 8 and 9. The automatic level 10 is comprised of a positive sighting objective lens 11, a negative focusing lens 12, a horizontal compensating optical system 13, a focusing plate assembly 14 including a first focusing plate 14a and a second focusing plate 14b, and a positive eyepiece (lens) 15. These optical components are arranged in this order from the object side. The horizontal compensating optical system 13, per se known, is provided with a first compensating prism 13a, a compensating mirror 13b and a second compensating prism 13c and has a symmetrical shape with respect to the center of the mirror 13b. The horizontal compensating optical system 13 hangs from a string 13e attached to a shaft 13d. The angle α defined by the compensating mirror 13b and the first compensating prism 13a, and the angle α defined by the compensating mirror 13b and the second compensating prism 13c, are identical in absolute value but have opposite signs (plus and minus). The angle α is determined depending on the length of the string 13e, etc., and is, for example, 30° in the illustrated embodiment.

If the optical axis of the objective lens 11 and the focusing lens 12 is slightly deviated from the horizontal, for example, by 10 to 15 minutes, the optical axis of light incident upon the first compensating prism 13a is also deviated from the horizontal by an equivalent amount. Nevertheless, the optical axis of the light emitted from the horizontal compensating optical system 13 is substantially horizontal. In this system, light is reflected by the first compensating prism 13a towards the compensating mirror 13b and then towards the second compensating prism 13c.

The focusing lens 12 is provided with a rack 12a secured thereto, which is in mesh with a pinion 12b. The pinion 12b is rotated by an operation knob 16 so as to rotate about an axis, normal to the optical axis, to vary the position of an object image formed by the objective lens 11 and the focusing lens 12. The object image is formed on the focusing plate 14, so that it can be viewed through the eyepiece 15 together with a sighting line, etc., provided on the focusing plate 14.

Figure 1:
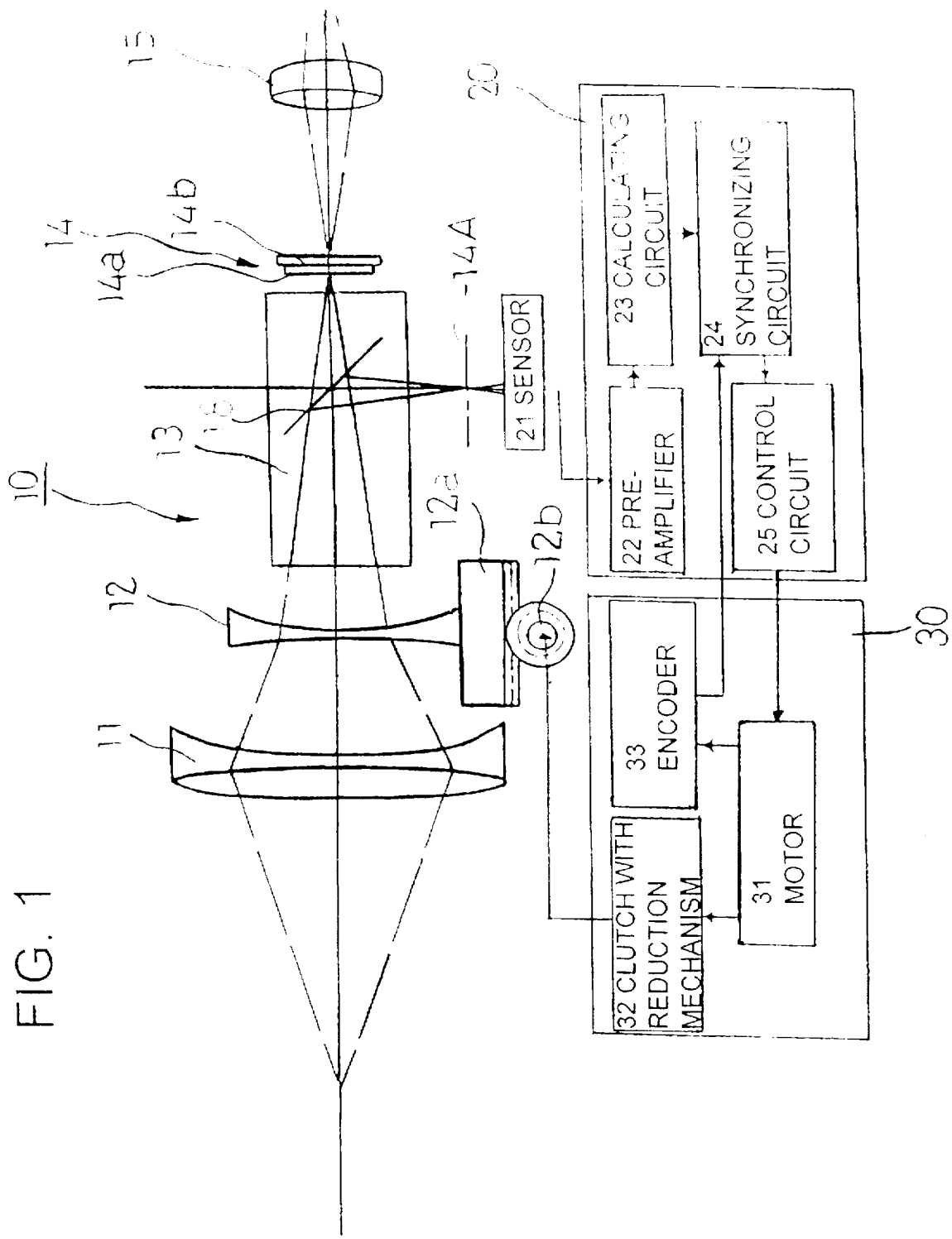
FIG. 1 is a conceptual view of the basic principle of an inner focus type telescope applied to an automatic level.

A TTL type AF system (automatic focusing) is incorporated in the automatic level 10 as constructed above. As can be seen in FIG. 1, a beam splitting optical element (half mirror) 18 is provided, in the light path between the objective lens 11 and the focusing plate 14, in order to split the light travelling along this light path. An equivalent surface 14A, located at a position optically equivalent to the focusing plate 14, and a focus detecting system 20 which detects the focus state at the equivalent surface 14A, are provided in the beam splitting optical system, formed by the beam splitting optical element 18. A focusing lens driving system 30 is also provided to drive the focusing lens 12, in accordance with an output from the focus detecting system 20.

The focus detecting system 20 which detects the focus state at the equivalent surface 14A, is provided with a sensor 21, located in the vicinity of the equivalent surface 14A. The in-focus state or out-of-focus state, the rear focus or the front focus, and the amount of defocus (deviation), etc., can be obtained by calculation in accordance with an output from the sensor 21, by means of a processor per se known.

Figure 7:
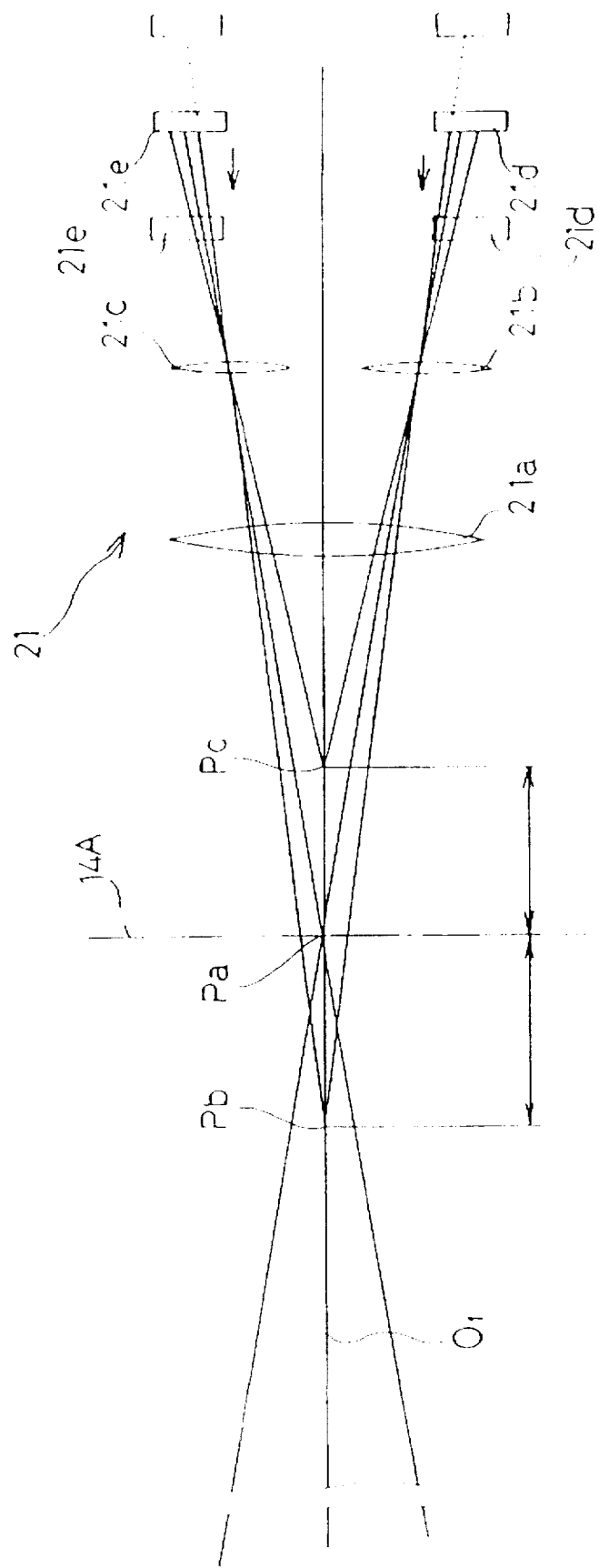
FIG. 7 is a conceptual view of a focus detecting optical system.

FIG. 7 shows the detection principle of the sensor 21 by way of example. There are, behind the equivalent surface 14A, a condenser lens 21a, a pair of separator lenses (imaging or reimaging lenses) 21b and 21c that are spaced at a distance identical to the base length, and a pair of line sensors 21d and 21e that are located behind the respective separator lenses 21b and 21c, to converge light and form an object image onto each of the line sensors 21d and 21e through the separator lenses 21b, 21c. The incident position of the object image upon the line sensors 21d and 21e varies depending on the focus state of the object image. Namely, the incident positions of the object image when the object image is correctly converged onto the equivalent surface 14A (in-focus Pa), when the object image is converged at a position in front of the equivalent surface 14A (front focus Pb), and when the object image is converged at a position behind the equivalent surface 14A (rear focus Pc), are different from each other. The amount of defocus (deviation of the focus) from the correct focal position can be detected in accordance with the positions of the object images to be formed on the line sensors 21d and 21e. Specifically, the outputs of the line sensors 21d and 21e are amplified by a pre-amplifier 22 and are thereafter calculated by the calculating circuit 23 to detect the in-focus condition, out-of-focus condition, front focus condition, rear focus condition, and defocus, amount.

The focusing lens driving system 30 transmits the rotation of a motor 31 to the pinion 12b through a reduction mechanism 32, which has a built-in clutch, which, in the manual mode, operates to brake the motor. The result calculated by the calculating circuit 23 is sent to the motor 31 through a synchronizing circuit 24 and a control circuit 25. The rotation of the motor 31 is monitored by an encoder 33 whose output is sent to the synchronizing circuit 24 to carry out feed-back control of the focusing lens 12.

The focusing lens 12 is moved by the focus detecting system 20 and the focusing lens driving system 30, in accordance with the object distance, to carry out the automatic focus control. The pinion 12b can be either manually rotated by the operation knob 16 or automatically rotated by the focus detecting system 20 and the focusing lens driving system 30. Namely, the automatic level 10 can selectively operate in an autofocus mode at which the focusing lens 12 is automatically moved in accordance with the output of the focus detecting system 20 or in a manual mode at which the focusing lens 12 can be manually moved independent of the output of the focus detecting system 20.

The autofocus mode and the manual mode can be switched, for example, in such a way that when the rotatable operation knob 16 is moved in one axial direction, the manual mode is obtained, and when the operation knob 16 is moved in another axial direction, the autofocus mode is obtained, respectively. A suitable switching mechanism is shown in U.S. Pat. Nos. 5,239,417 4,890,132 and 4,893,145, the disclosures of which are expressly incorporated herein by reference in their entireties.

The line sensors 21d and 21e are preferably located to be perpendicular to a pole (staff or rod) set in the ground, to be sighted by the present automatic level. Since, the direction of the line sensors 21d, 2e does not coincide with the direction of the pole, the AF function can be certainly obtained.

Figure 2:
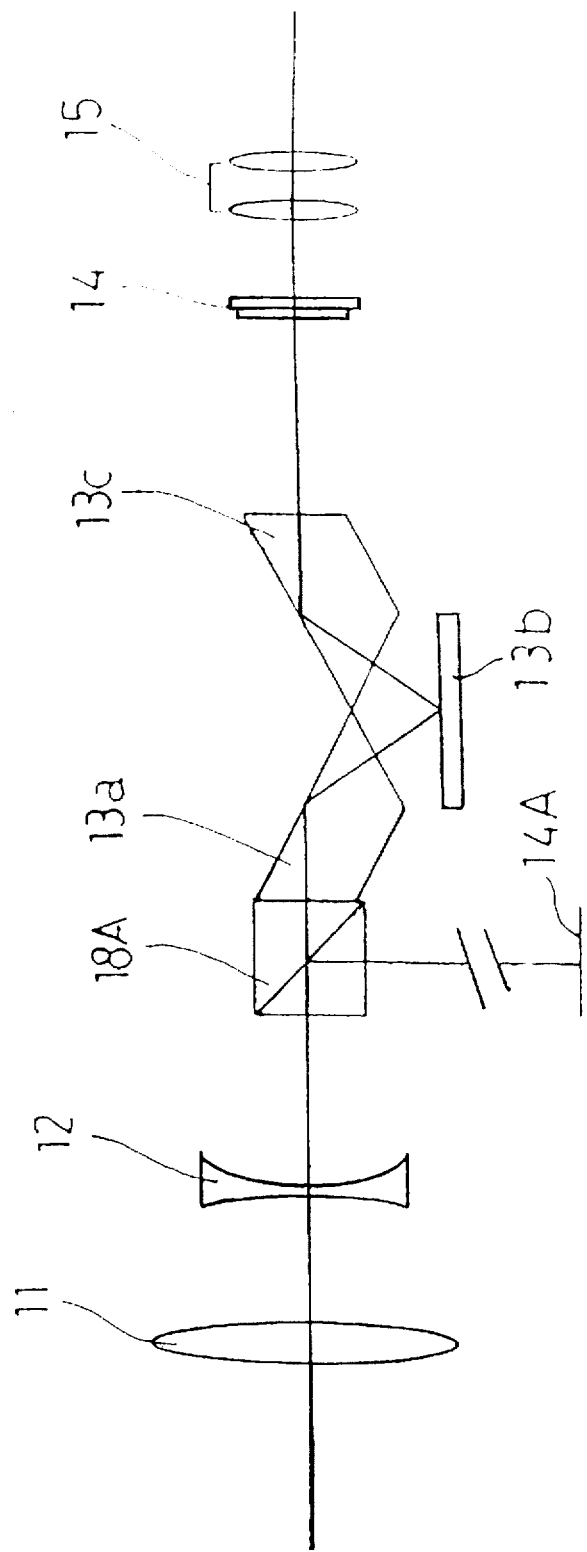
FIG. 2 is an optical arrangement of an automatic level in which a beam splitting optical element is inserted, according to a first embodiment of the present invention.

FIGS. 2 through 6 show examples of the position of the beam splitting optical element 18. In FIG. 2, the beam splitting optical element 18 is in the form of a beam splitting half prism 18A, cemented to the light incident surface of the first compensating prism 13a of the horizontal compensating optical system 18. The equivalent surface 14A and the sensor 21 are provided in the beam splitting optical system constituted by the half prism 18A.

Figure 3:
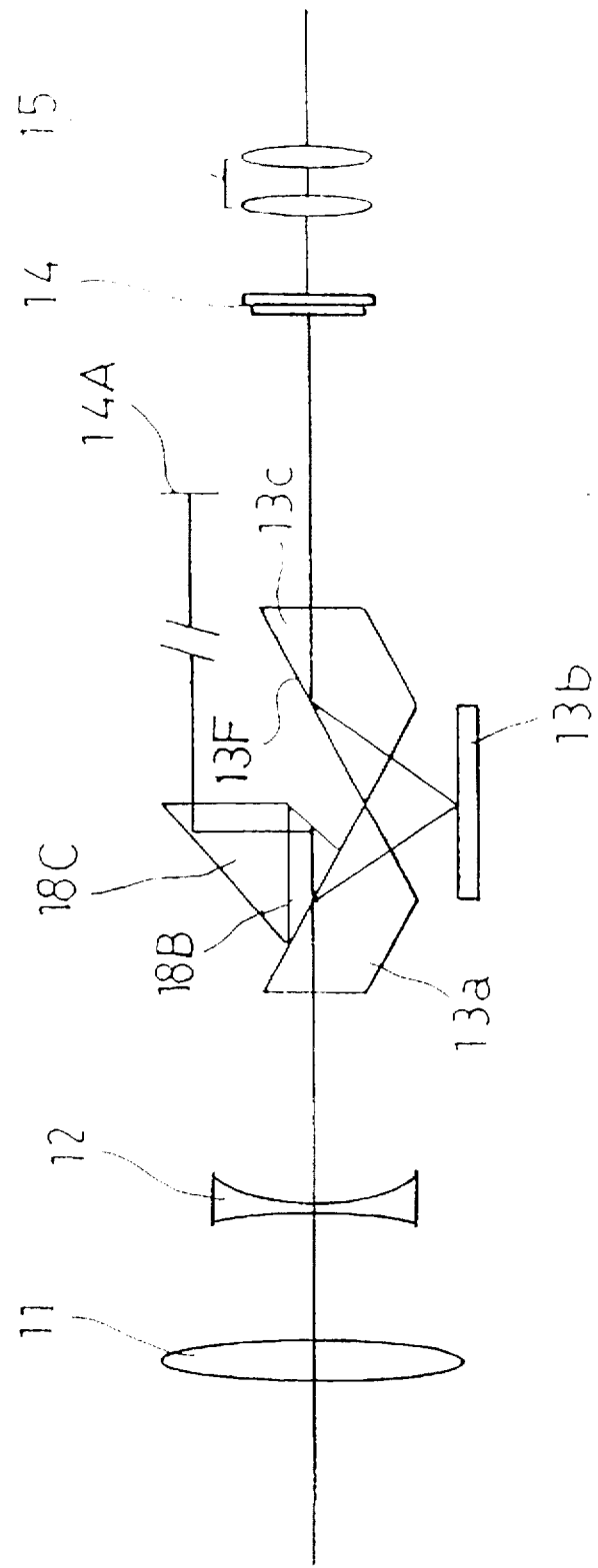
FIG. 3 is an optical arrangement of an automatic level in which a beam splitting optical element is inserted, according to a second embodiment of the present invention.

In FIG. 3, the beam splitting optical element 18 is realized by a pair of half prisms 18B and 18C provided on the reflecting surface of the first compensating prism 13a of the horizontal compensating optical system 18. The equivalent surface 14A and the sensor 21 are provided in the beam splitting optical system constituted by the half prisms 18B and 18C. In this arrangement, the reflecting surface of prism 13a, to which half prism 18B is attached, is a half mirror surface.

Figure 4:
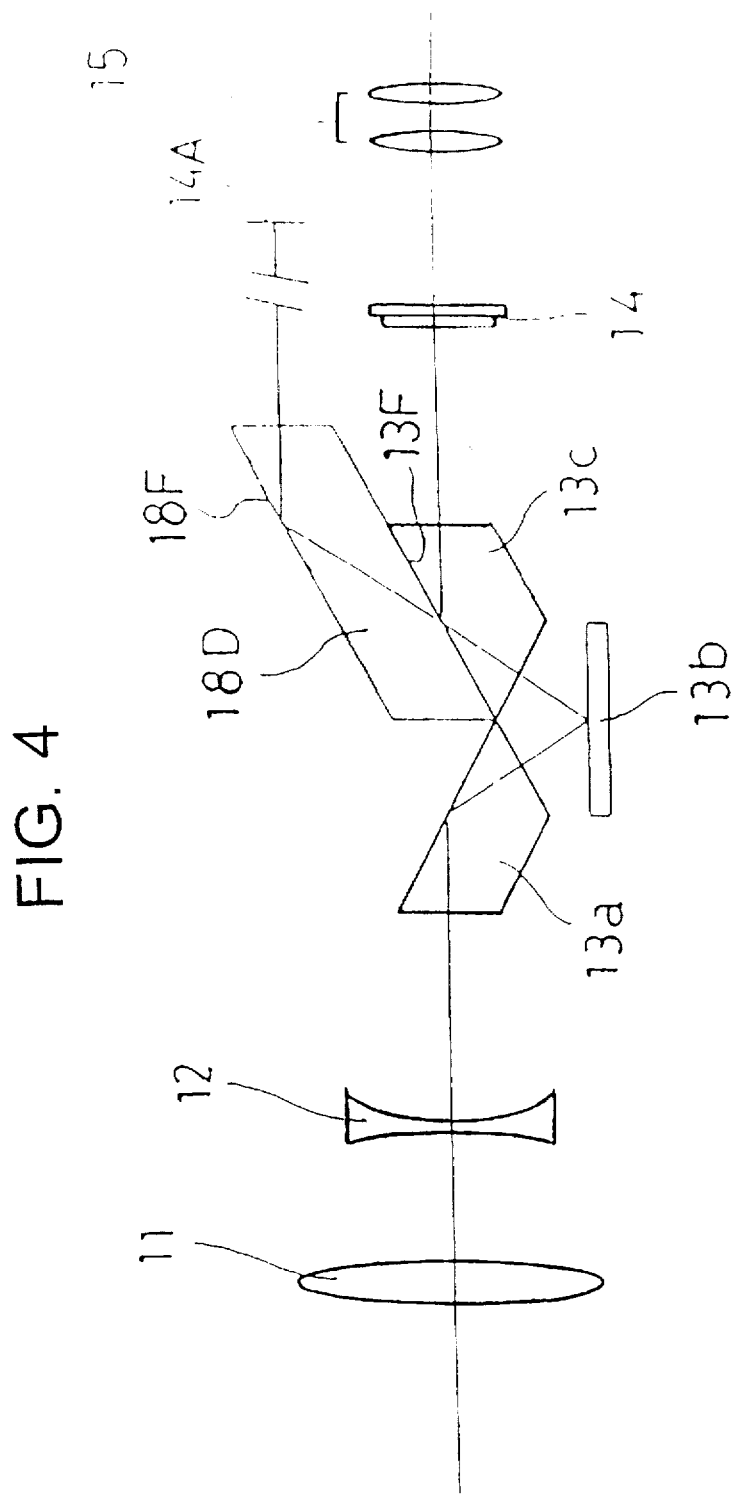
FIG. 4 is an optical arrangement of an automatic level in which a beam splitting optical element is inserted, according to a third embodiment of the present invention.

In FIG. 4, the beam splitting optical element 18 is realized by a beam splitting half prism 18D adhered to a reflecting surface 13F of the second compensating prism 13C or the horizontal compensating optical system 18. The equivalent surface 14A and the sensor 21 are provided in the beam splitting optical system constituted by the half prism 18D. In the arrangement shown in FIG. 4, a reflecting surface 18F of the half prism 18D can be formed as a roof surface to obtain an erect image.

Figure 5:
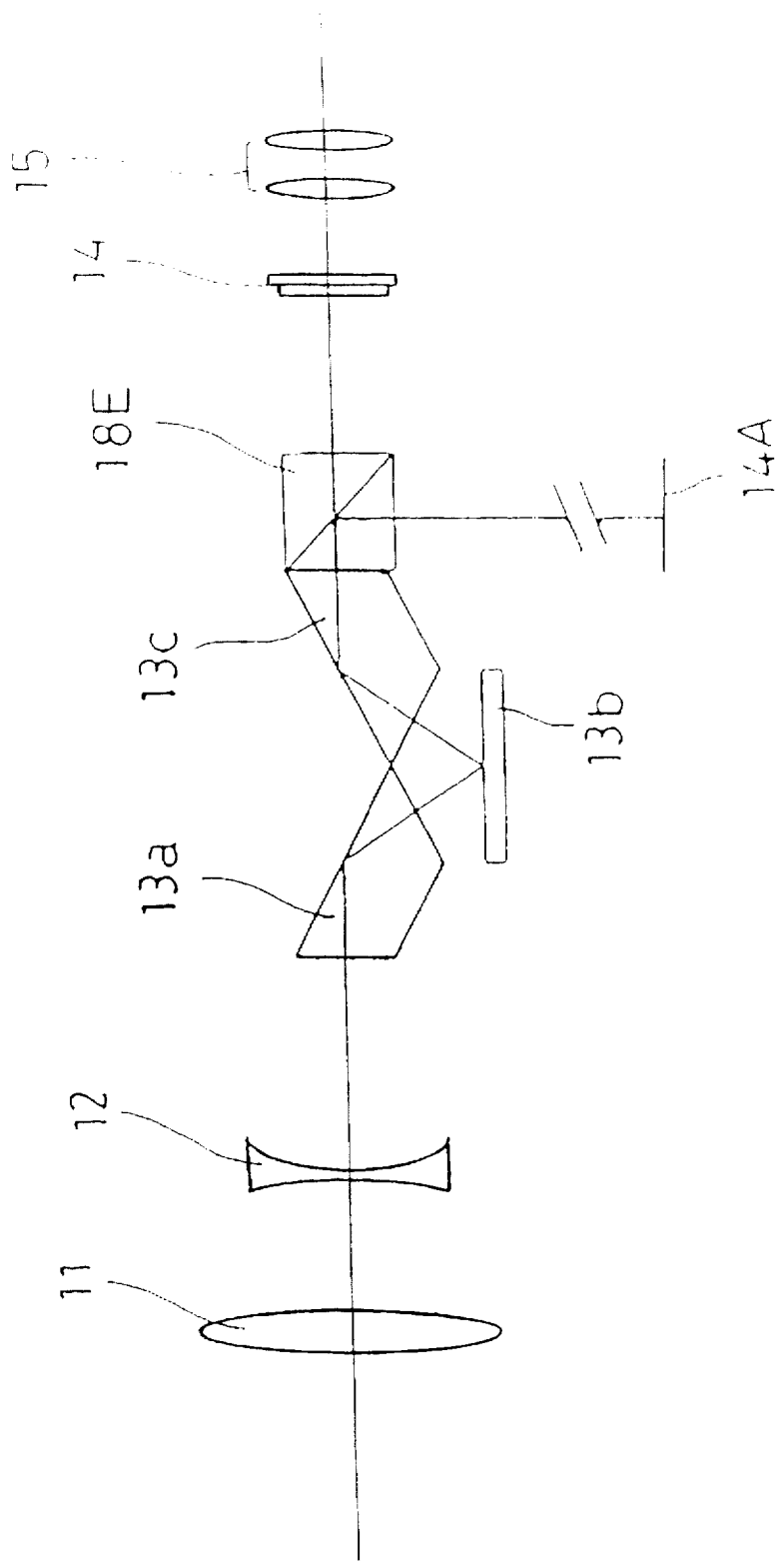
FIG. 5 is an optical arrangement of an automatic level in which a beam splitting optical element is inserted, according to a fourth embodiment of the present invention.

In FIG. 5, the beam splitting optical element 18 is realized by a beam splitting half prism 18E adhered to the light emitting surface of the second compensating prism 13c of the horizontal compensating optical system 18. The equivalent surface 14A and the sensor 21 are provided in the beam splitting optical system constituted by the half prism 18E.

In the arrangements shown in FIGS. 1 through 5, if the reflecting surface 13F of the second compensating prism 13c defines a roof surface, an erect image is obtained.

In any one of the arrangements shown in FIGS. 2 through 5, the output of the sensor 21 can be used to drive the focusing lens 12 through the focus detecting system 20 and the focusing lens driving system 30, or to indicate the in-focus, out-of-focus, front focus, or rear focus states.

As can be understood from the foregoing, the location of the beam splitting optical element 18, to be inserted in the light path between the objective lens 11 and the focusing plate 14, can be designed with freedom. In any embodiment, the focus state at the equivalent surface 14A can be detected. Furthermore, if the beam splitting optical element 18 (beamsplitter) is adhered to the surface of the first compensating prism 13a or the second compensating prism 13c in advance, not only can the handling of the beam splitting optical element 18 be facilitated, but also the structure of the beam splitting optical system can be simplified.

Out of the embodiments illustrated in FIGS. 2 through 5, the embodiment illustrated in FIG. 5 is most preferable. In the automatic level 10, so long as the optical axis of the objective lens 11 and the focusing lens 12 is set to be substantially horizontal, the optical axis of the light emitted from the horizontal compensating optical system 13 is substantially horizontal and a possible deviation of the optical axis of the light emitted from the horizontal compensating optical system is practically negligible, as mentioned above. If the light emitted from the horizontal compensating optical system 13 is split, the image to be observed, formed on the focusing plate 14, is identical to the image formed on the equivalent surface 14A. However, if light other than the light emitted from the horizontal compensating optical system 13 is split, i.e., light before entering the horizontal compensating optical system 13 is split, the deviation between the image formed on the focusing plate 14 (i.e., that which is actually observed) and the image formed on the equivalent surface 14A increases as the deviation of the optical axis of the objective lens 11 and the focusing lens 12 from the horizontal increases. In an extreme case, the observed image could be so different from the image used to detect the focus state, that no correct focus detection or automatic focusing would be executed. This problem would not of course be caused in the embodiments illustrated in FIGS. 2 through 4, if the degree of coincidence between the optical axis of the objective lens 11 and the focusing lens 12 and the horizon is high.

Figure 6:
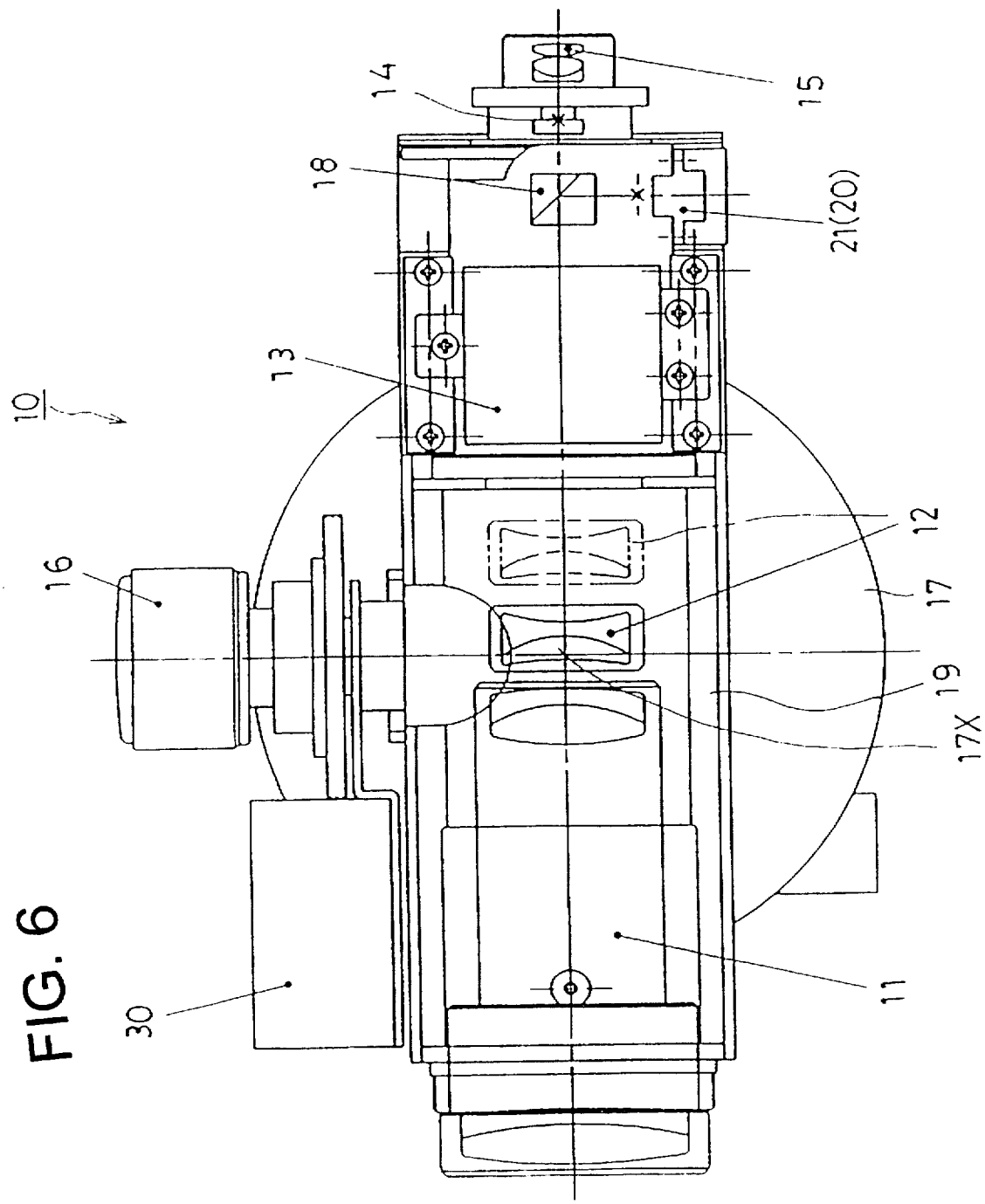
FIG. 6 is a plan view of the automatic level shown in FIG. 5.

FIG. 6 shows a plane view of the automatic level 10 having the automatic focusing function mentioned above. Components corresponding to those in FIGS. 1 and 5 are designated with like reference numerals. All the components of the automatic level discussed above are supported by a lens barrel 19 secured to a rotary table 17. Note that the beam splitting optical element 18 is not adhered to the second compensating prism 13c of the horizontal compensating optical system 13. The rotary table 17 is rotatable about a vertical axis 17X which is perpendicular to the optical axis of the objective lens 11 and the focusing lens 12, so that an object located at any distance along the same horizontal plane can be viewed.

It is preferable that the telescope is provided with a user offset function to manually adjust the focal position. Namely, for example, there is a possibility that a position which a user considers to be in-focus is in fact different from the in-focus position judged and detected by the AF system, due to the state of the user's eyes, etc. If this occurs, the user offset function is adapted to set the focal position of the AF system, based on a reference position, which the user considers to be in the "focused state". The offset function is established in accordance with an electrical process, or by a mechanical adjustment of the position of the line sensors 21d and 21e. Namely, in the electrical process, the incident positions of light (i.e., object images) upon the line sensors 21d and 21e are set to be in the in-focus positions when the user considers that the focused state has been obtained. In the mechanical adjustment, when the user considers that the focused state has been obtained, the line sensors 21d, 21e are moved or adjusted to obtain an in-focus signal.

In addition, if the lenses (objective lens 11, the focusing lens 12, etc.) in the automatic level 10 are comprised of plastic lenses, they are considerably influenced by a change in moisture (i.e., humidity). Namely, if the level of moisture changes, the focal length of each lens will vary due to a change in the curvature of the lens surfaces. As a result, the position which the user considers to correspond to the focused state can deviate from the focal position detected and judged by the AF system. To eliminate such a deviation, there are three counter measures based on an optical process, an electrical process and a mechanical adjustment, as will now be discussed.

Figure 13:
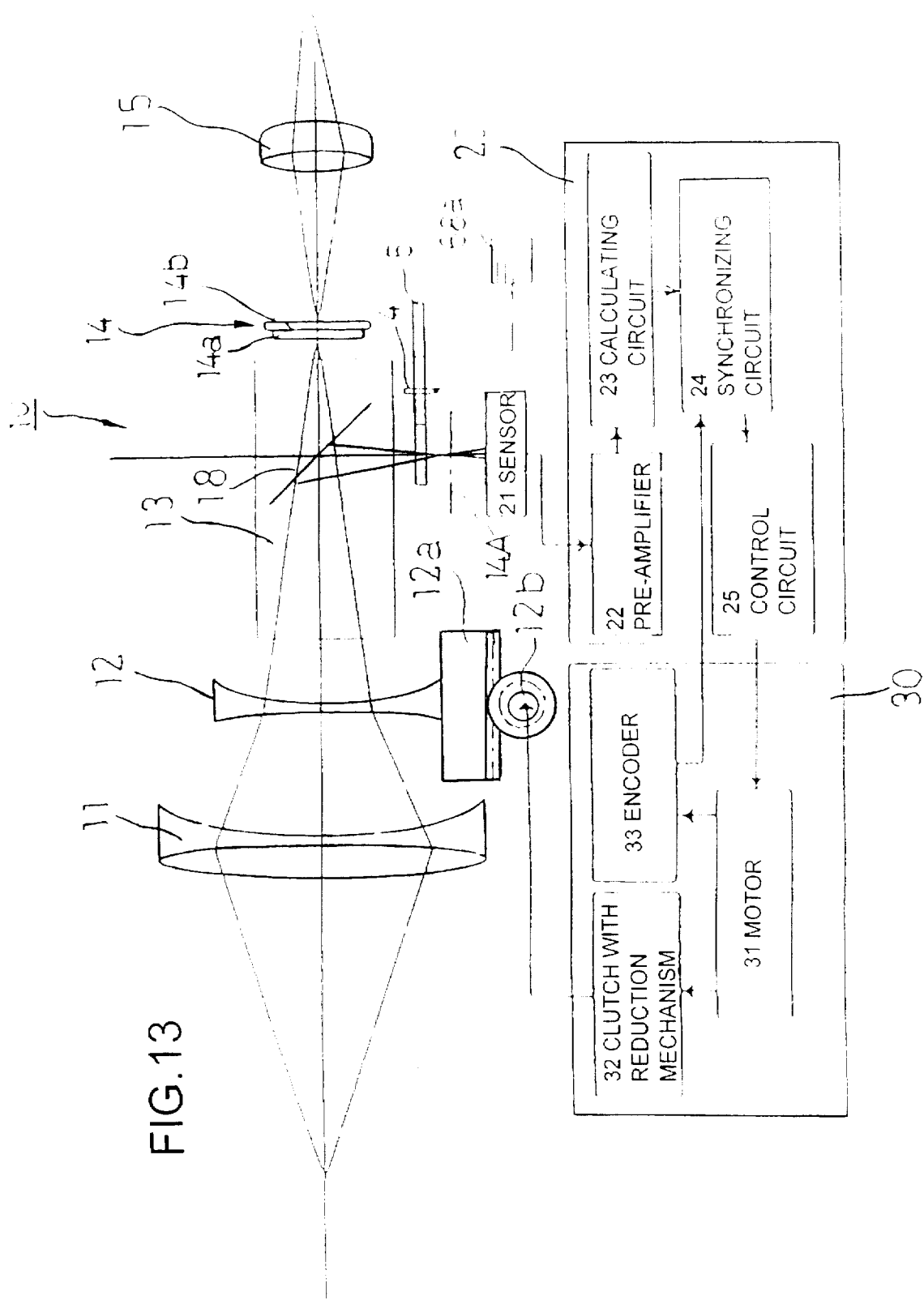
FIG. 13 is a conceptual view of the principle of the system shown in FIG. 10.
Figure 14:
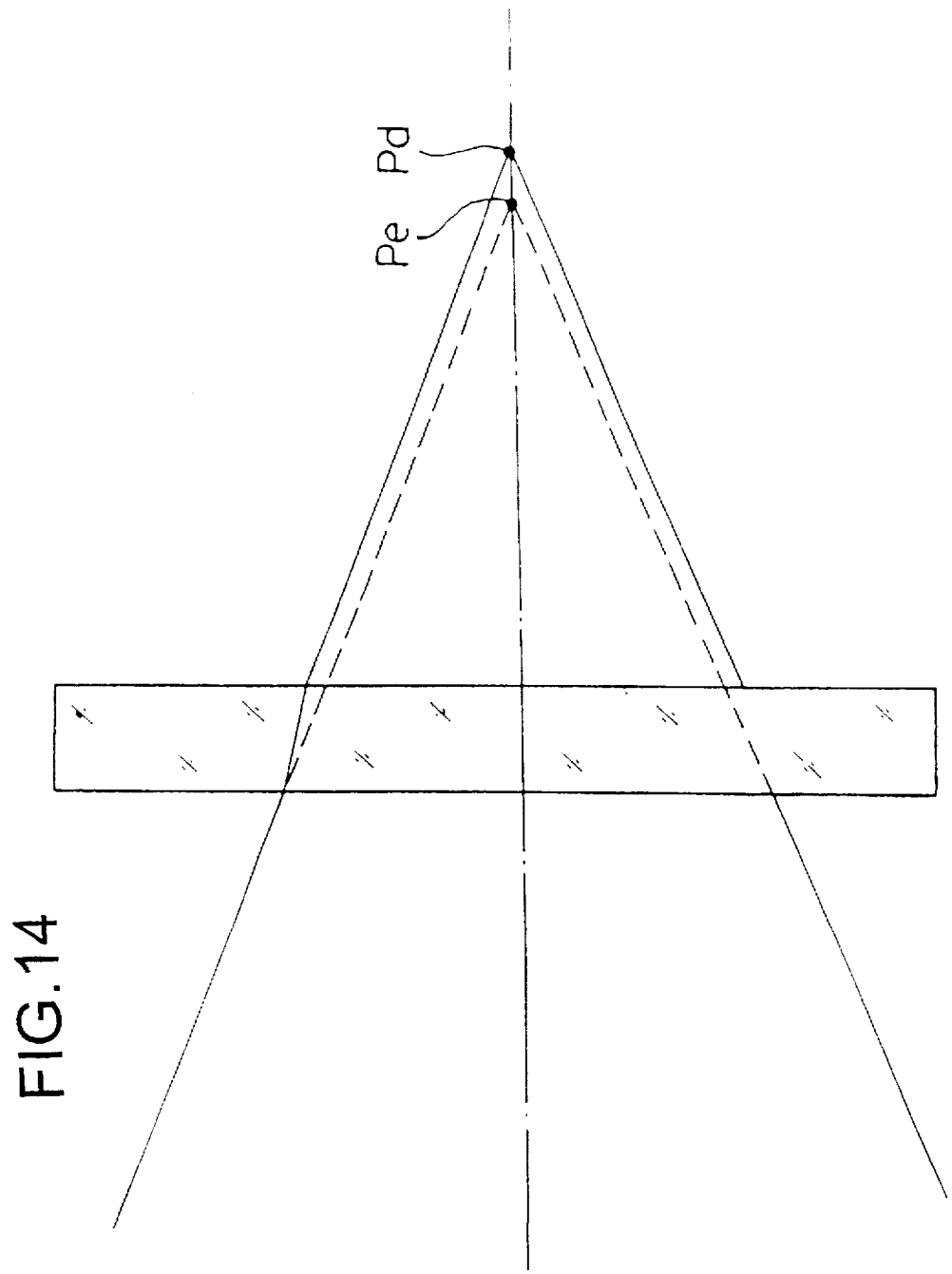
FIGS. 14 and 15 are conceptual views showing a movement of a focal point caused by a transparent plane-parallel plate.
Figure 15:
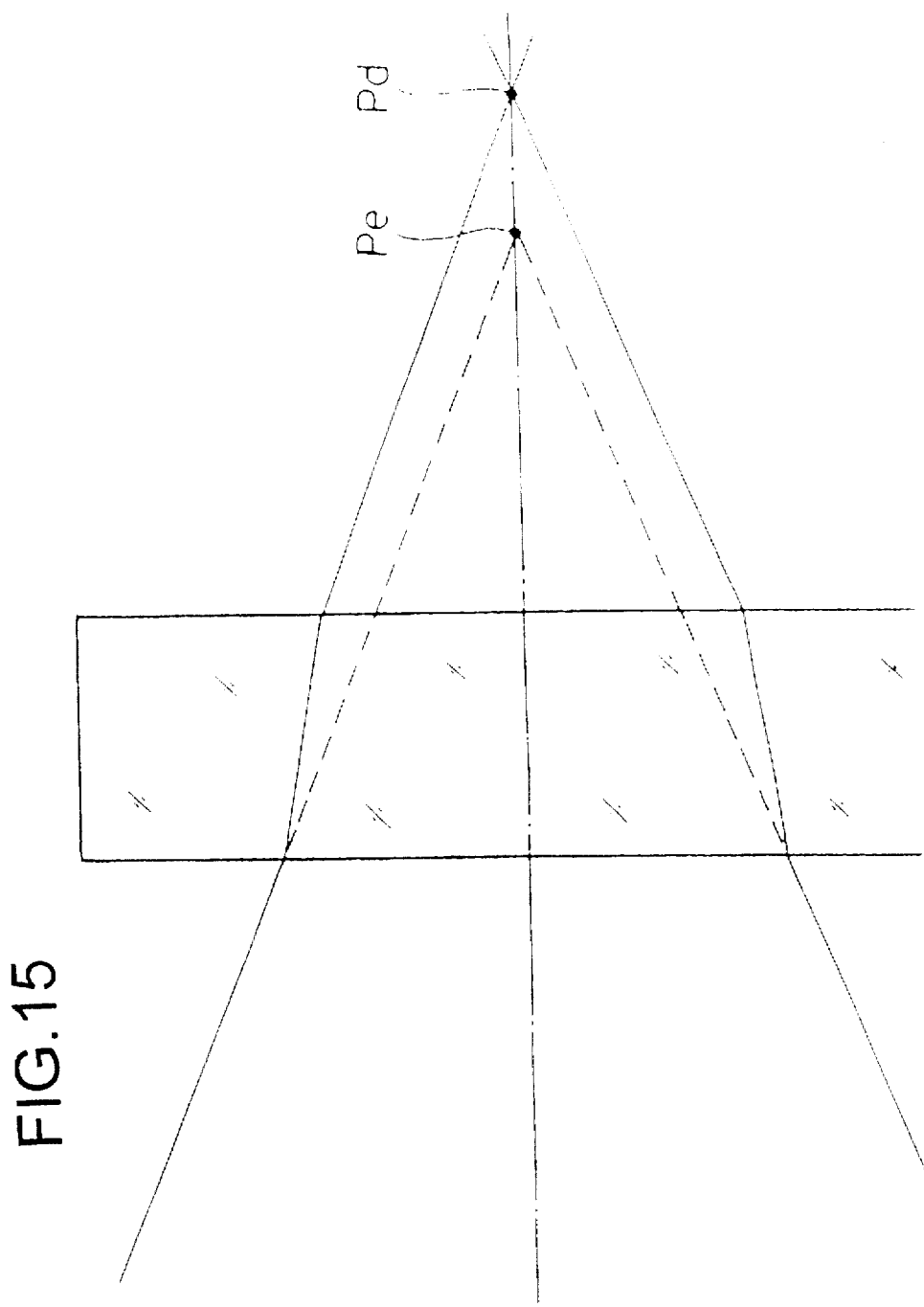

FIGS. 10 through 15 show an embodiment in which the deviation is eliminated by an electrical process (electrical user offset function). In FIG. 13, an adjusting optical element 5 is inserted in the beam splitting optical system (sensor optical system), between the beam splitter 18 and the sensor 21, of the arrangement shown in FIG. 1. The adjusting optical element 5 is manually rotated by a manual operation knob 68a. The other elements shown in FIG. 13 are the same as those in FIG. 1.

The adjusting optical element 5 is rotatably supported by the rotating shaft 4 at an appropriate part of the automatic level 10. The adjusting element 5 is provided with a plurality of transparent plane-parallel plates 5a through 5g which are spaced at an equi-angular distance about the shaft 4, as shown in FIG. 11. The transparent plane-parallel plates 5a through 5g have gradually differing thicknesses. The transparent plane-parallel plates 5a through 5g are each made of a transparent material such as a glass, which is influenced little by external factors such as temperature and particularly moisture, upon measurement. The thicknesses of the transparent plane-parallel plates 5a through 5g are 0.91 mm, 0.94 mm, 0.97 mm, 1.00 mm, 1.03 mm, 1.06 mm, and 1.09 mm, respectively. Note that "5h" in FIG. 11 designates a circular hole having no transparent plane-parallel plate, which is located in the light path when it is not necessary to change the position of the convergent point of the light travelling from the beam splitting optical element 18 toward the equivalent surface 14A. The adjusting optical element 5 and the transparent plane-parallel plates 5a through 5g constitute a correcting device.

One of the transparent plane-parallel plates 5a through 5g, is selected as a reference plate, in this case the transparent plane-parallel plate 5d. The thickness (e.g., 1.00 mm), of this plate is determined in accordance with an average humidity in the area in which the automatic level 10 is manufactured. With reference to the reference plate 5d (humidity reference plate), the transparent plane-parallel plates 5a, 5b, and 5c whose thicknesses are, respectively, 0.91 mm, 0.94 mm and 0.97 mm, are located in this order on the "drier side" of the reference humidity, and the transparent plane-parallel plates 5e, 5f, and 5g whose thicknesses are, respectively, 1.03 mm, 1.06 mm and 1.09 mm, respectively are located in this order on the "moister side" of the reference humidity. The transparent plane-parallel plates 5a through 5g can be selectively moved into the sensor optical system (beam splitting optical system) optical path by rotating the adjusting member 5. "A" and "B" in FIG. 10 represent the width of the variation of the light convergent point (focal point) when the transparent plane-parallel plates 5a, 5b, 5c and 5d are used, and when the transparent plane-parallel plates 5e, 5f, and 5g are used, respectively.

The transparent plane-parallel plates 5a through 5g have no optical power, but when they are selectively inserted, for example, in an optical path of the convergent light, the convergent point Pd is moved forward (in the right hand direction of FIG. 14) with respect to the convergent point Pe of the light when no transparent plane-parallel plate is inserted. The movement of the convergent point Pd increases as the thickness of the transparent plane-parallel plate increases, as may be seen in FIG. 15. Namely, the transparent plane-parallel plates 5a through 5g whose thicknesses gradually increase, when inserted in the light path, cause the convergent point to gradually move forward. Consequently, if the convergent point obtained when, for example, the transparent plane-parallel plate 5d is inserted in the light path is set to be identical to the focal point Pa (FIG. 10) which is located on the equivalent surface 14A, the transparent plane-parallel plates 5a through 5c can gradually move the convergent point Pb towards the focal point Pa, and the transparent plane-parallel plates 5e through 5g can gradually move the focal point Pa toward the convergent point Pc.

The adjusting optical member 5 is provided on the outer peripheral surface thereof with a plurality of latching recesses 40 (FIG. 12) that are spaced at an equi-angular distance corresponding to the transparent plane-parallel plates 5a through 5g and the circular hole 5h. A click spring (not shown) is provided opposed to the adjusting optical element 5 to selectively engage with one of the latching recesses 40 to thereby lock one of the transparent plane-parallel plates 5a through 5g at a desired position. The optical adjusting member 5 selectively brings the transparent plane-parallel plates 5a through 5g in the beam splitting optical system to correct the optical deviation of the focal plane 14 and the equivalent surface 14A thereof to thereby eliminate the difference between an assumed focal position recognized by the user and an in-focus position automatically determined by the AF system.

Figure 21:
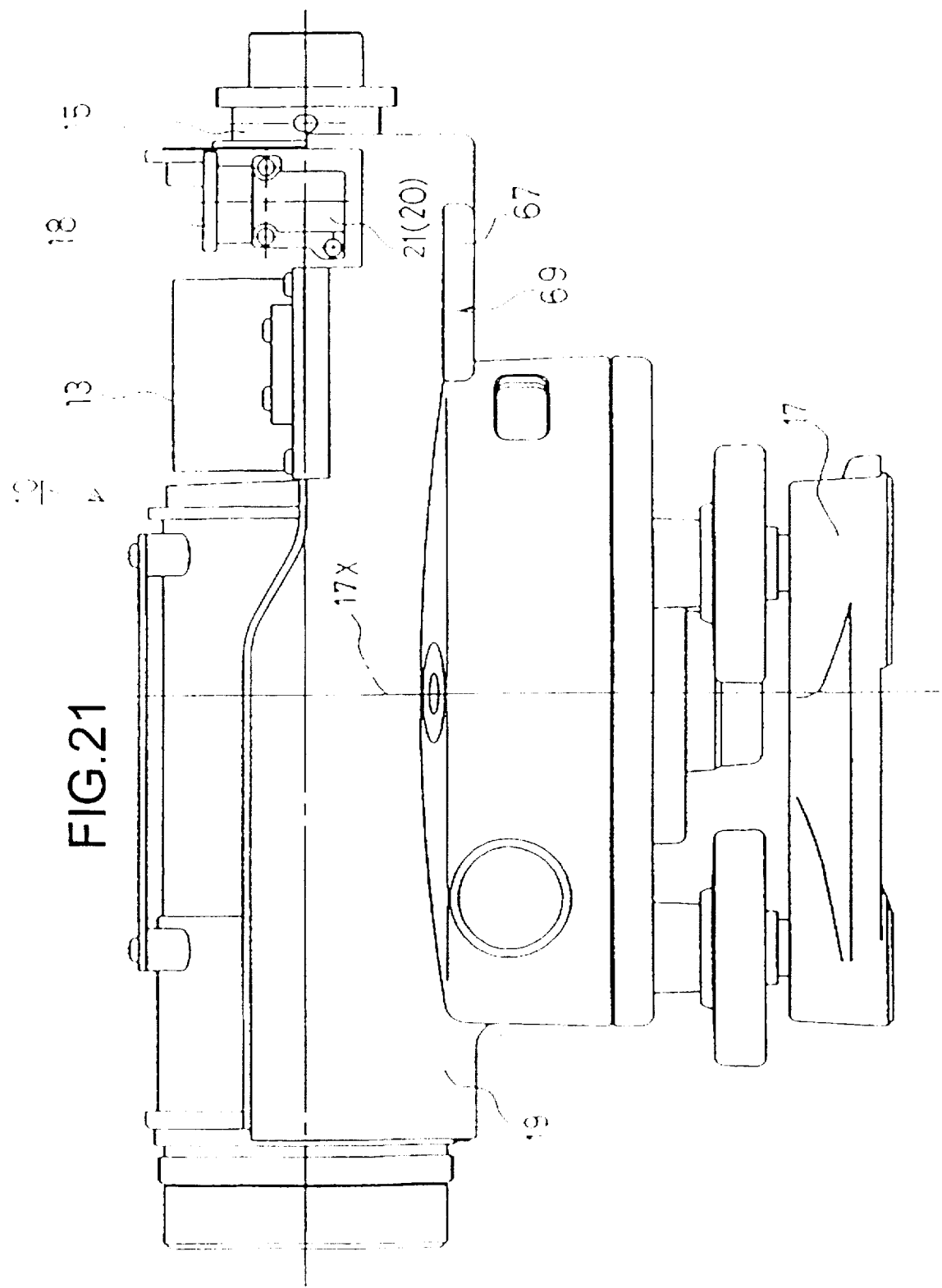
FIG. 21 is a side elevational view of an automatic level in which an operation knob is provided in a battery box; and, FIG. 22 is a bottom view of an automatic level in which a lid is removed from a battery box to illustrate the operation of an operation knob.
Figure 22:
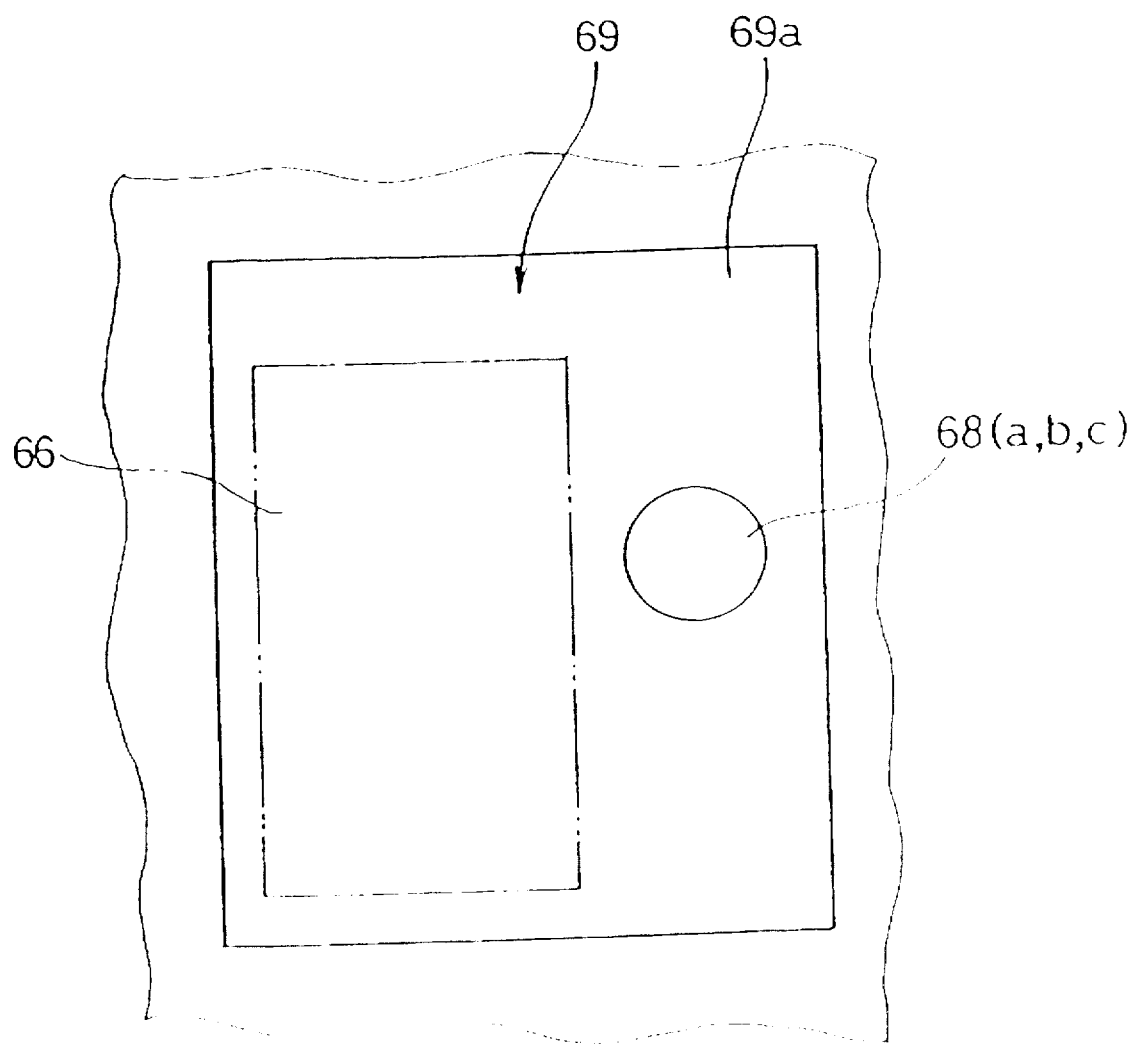

FIG. 21 shows a side elevational view of the automatic level 10 shown in FIG. 6 having the adjusting optical member 5. In FIG. 21, a battery box 69 is provided under the horizontal compensating optical system 13. A battery 66 (FIG. 22) is received in the battery box 69 which can be closed tightly by a lid (cover) 67, so as be waterproof. The battery box 69 is provided with a recess 69a in which the battery 66 is accommodated, and an operation knob (operating portion) 68a located on one side of the battery 66, as shown in FIG. 22. The operation knob 68a is rotated so as to rotate the adjusting optical element 5 through an association mechanism (not shown), to thereby selectively move the transparent plane-parallel plates 5a through 5g into the beam splitting optical system (sensor optical system). The battery box 69 is constructed in such a way that the user can easily interchange the battery while maintaining a waterproof state of the automatic level 10.

Consequently, the user can easily rotate the operation knob 68a provided in the battery box 69 to rotate the adjusting optical element 5 when the lid 67 is opened or removed. The inside of the battery box 69 (i.e., the operation knob 68a and the battery 66) is normally waterproof when the battery box is closed by the lid 67.

Consequently, if the focal position detected by the AF system is not identical to the focal position recognized by the user, due to an external factor such as moisture, etc., upon measurement using the automatic level 10, so that the user who observes the object image through the eyepiece 15 would find that the image is out of focus, in spite of the AF control, the user opens the lid 67 and rotates the operation knob 68a to obtain an in focus object image. Namely, the adjusting optical element 5 is manually rotated through a predetermined angular displacement in a predetermined direction (toward the "drier side" or "moister side") depending on the level of the moisture upon measurement.

For instance, if the automatic level 10 is used in a dry area and the convergent point of the light in the beam splitting optical system is located between the points Pa and Pc in FIG. 10, the adjusting member 5 is rotated in the "dry" direction. Consequently, a thinner transparent plane-parallel plate is moved into the optical path of the beam splitting optical system. For example, if the thinnest transparent plane-parallel plate 5a is brought into the optical path of the beam splitting optical system, the maximum displacement of the convergent point, located between the points Pa and Pc, takes place towards the point Pa.

Conversely, if the automatic level 10 is used in a moist area and the convergent point of the light in the beam splitting optical system is located between the points Pa and Pb in FIG. 10, the adjusting member 5 is rotated in the "moister" direction. Consequently, a thicker transparent plane-parallel plate is moved into the optical path of the beam splitting optical system. For example, if the thickest transparent plane-parallel plate 5g is brought into the optical path of the beam splitting optical system, the maximum displacement of the convergent point, located between the points Pa and Pb, takes place towards the point Pa. The user repeatedly carries out the above-mentioned operations while observing the image through the eyepiece 15, depending on the environment, until an in focus image is obtained.

Although the correcting device for correcting the positional difference between the focusing plate (focal plane) 14 and its equivalent surface 14A is comprised of the transparent plane-parallel plates 5a through 5g having no optical power in the above mentioned embodiments, the present invention is not limited thereto. Namely, it is possible to provide a plurality of lenses having gradually different focal lengths on the adjusting optical element 5 in a positional arrangement similar to that of the transparent plane-parallel plates.

Figure 16:
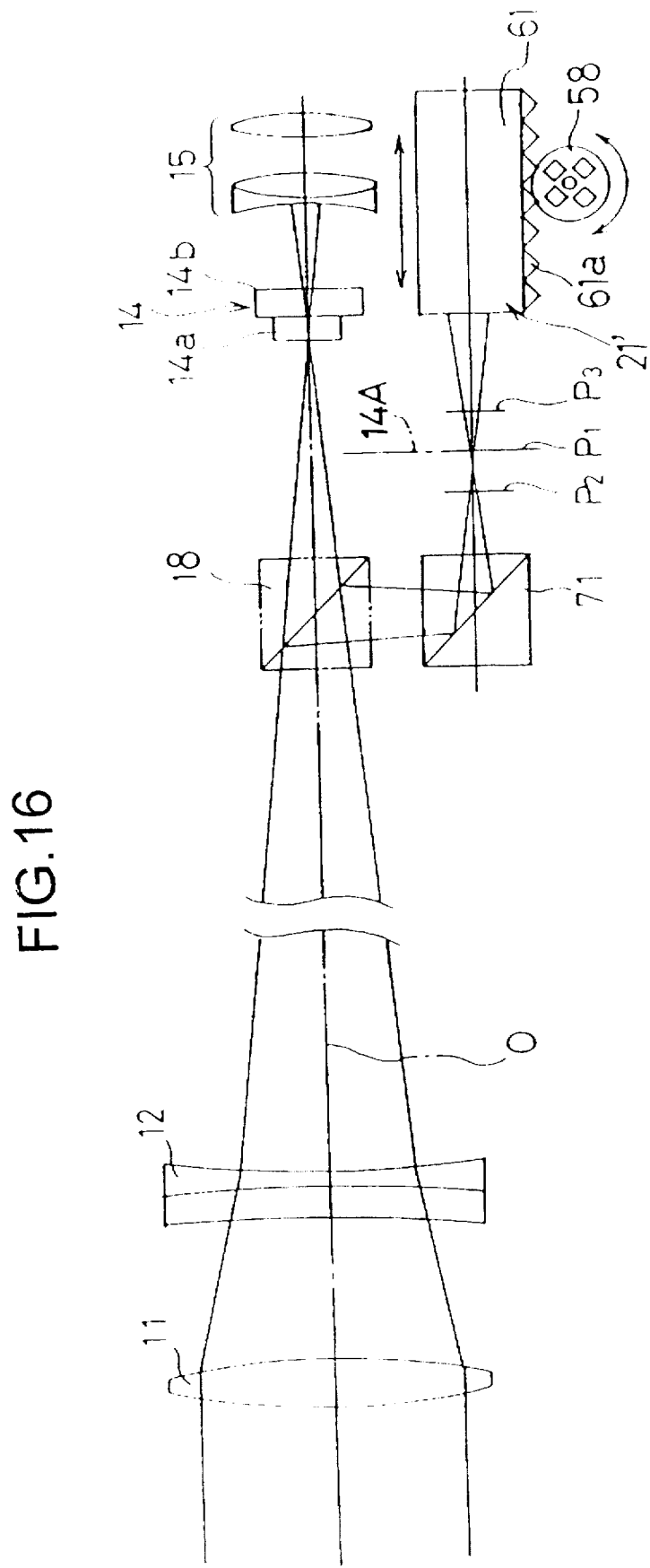
FIG. 16 is a schematic view of an automatic level having a mechanical user offset function, according to an aspect of the present invention.
Figure 17:
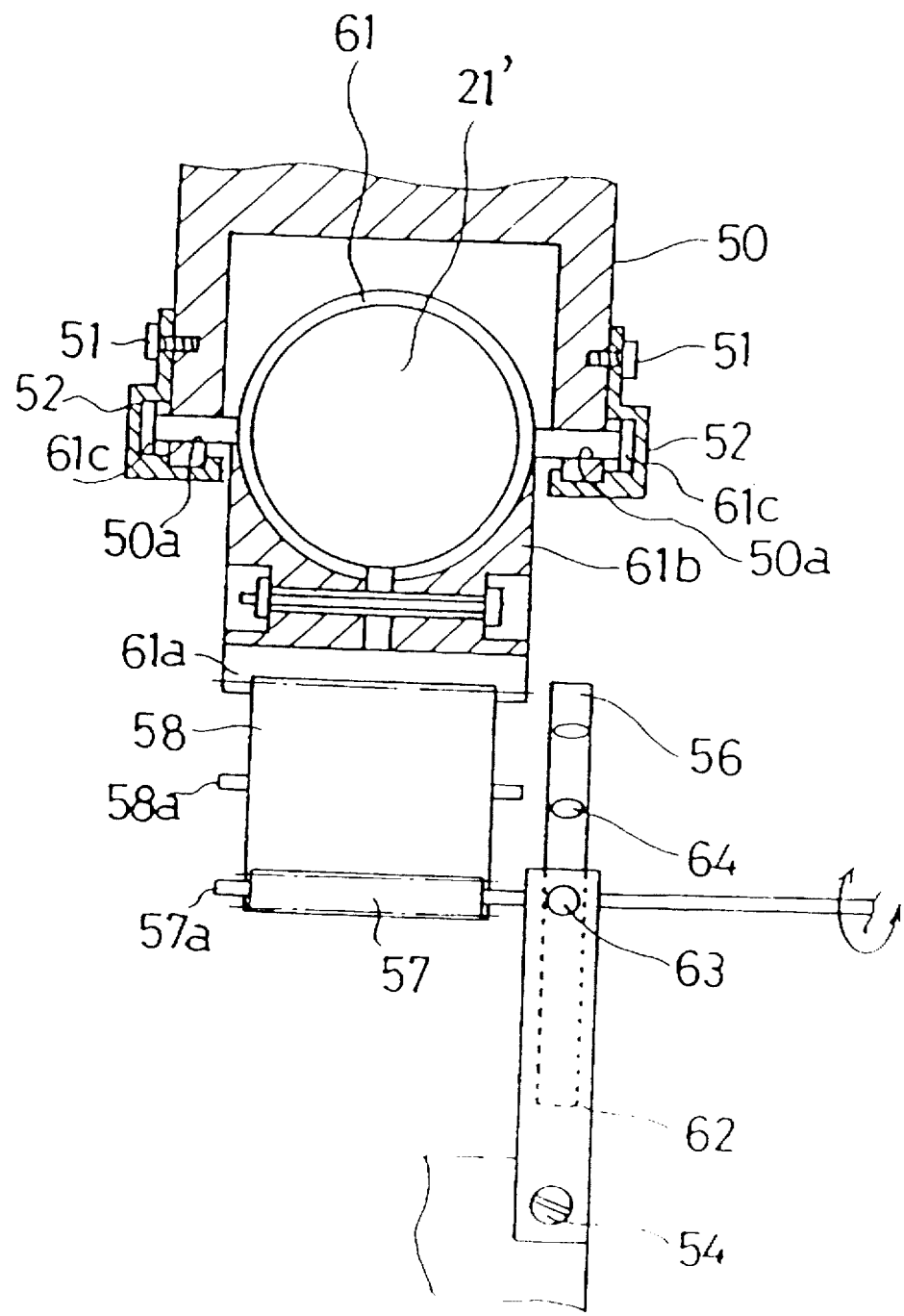
FIG. 17 is a sectional view of the sensor shown in FIG. 16, which moves relative to an equivalent surface and a movement adjusting mechanism of the sensor, taken along a direction perpendicular to the optical axis.
Figure 18:
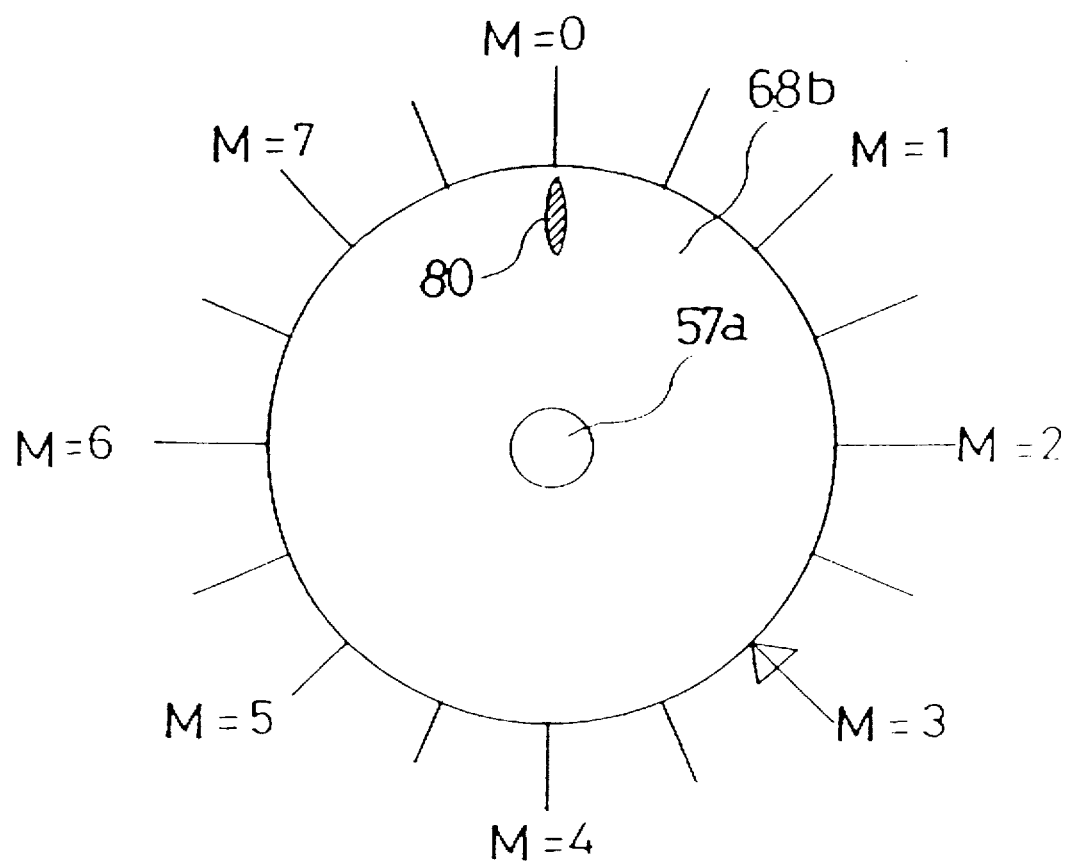
FIG. 18 is a front elevational view of an operation knob which is actuated to determine the movement of the sensor.

The following discussion will be directed to another embodiment in which the user offset function is realized in accordance with a mechanical process, with reference to FIGS. 16 through 18. In this embodiment, the sensor is mechanically moved in the optical axis direction, so that when the user visually recognizes that the focused state is obtained, a focus signal is produced in the AF system.

The main parts of the automatic level in this embodiment are shown in FIG. 16. As can be seen in FIG. 16, a sensor 21' is guided to move in a direction substantially parallel with an optical axis O of the sighting optical system, without increasing the size of the apparatus in the radial direction of the focusing lens 12. A reflecting optical system 71 is provided between the sensor 21' and the beam splitting optical element 18, so that the light split by the beam splitting optical element 18 can be made incident upon the sensor 21'. The reflecting optical system 71 deflects the light split by the beam splitting optical element 18 by about 90° toward the sensor 21'. The equivalent surface 14A is located between the reflecting optical system 71 and the sensor 21'.

As shown in FIGS. 16 and 17, the sensor 21' is housed in a sensor support 61 which is supported by a stationary support 50 provided in the body of the automatic level 10, so as to move in a direction parallel to the optical axis O. The sensor support 61 is provided with a pair of guide projections 61c which extend in the right and left directions in FIG. 17 and which are slidably fitted in right and left guide grooves 50a provided in the stationary support 50. The front ends of the guide projections 61c, that project outward from the guide grooves 50a, are covered by covers 52 secured to the outer wall surface of the stationary support 50 through screws 51.

The sensor support 61 is provided, on a lower projection 61b thereof, with a rack 61a which extends in a direction parallel to the optical axis O. The rack 61a is engaged by a pinion 58 which is rotatably supported by a shaft 58a provided in the body of the automatic level. The pinion 58 is in mesh with a power transmission gear 57. A shaft 57a of the gear 57 is operatively connected at the front end thereof to the operation knob (operating portion) 68b provided in the battery box 69 shown in FIG. 22. To the shaft 57a is secured a rotatable disc 56 which is provided on the outer peripheral surface thereof with a plurality of latching recesses 64, spaced at an equi-angular distance. A click spring 62 is secured to the body of the apparatus by a screw 54 so as to be opposed to the rotatable disc 56. The click spring 62 is provided with an engaging pawl 63 which can be selectively engaged in the latching recesses 64 to lock the transmission gear 57 and accordingly the pinion 58 in a desired position. The rack 61a and the pinion 58 constitute a moving/adjusting device and a correcting device.

As shown in FIG. 18, a scale (a series of marks) is provided around the manual operation knob (dial) 68b, which represent successive displacements of the sensor 21' depending on external factors, such as, moisture upon measurement. There are seven marks, M=0 through M=7, which correspond to the displacement of the sensor 21', as shown in Table 1 below. In the FIG. 18, numeral 80 designates the pointer of the dial (operation knob 68b), to selectively indicate the marks.

TABLE 1

| Scale M | Amount of Offset (μm) |
|---|---|
| 0 | −150 |
| 1 | −100 |
| 2 | −50 |
| 3 | 0 |
| 4 | +50 |
| 5 | +100 |
| 6 | +150 |
| 7 | +200 |

According to this embodiment, the above-mentioned problems, discussed with reference to FIGS. 10 through 15, can be solved merely by rotating the operation knob 68b after the lid 67 is opened. Namely, if the focal position detected by the AF system is not identical to the focal position recognized by the user, due to an external factor such as moisture, etc., upon measurement using the automatic level 10, so that the user who observes the object image through the eyepiece 15 would find that the image is out of focus, in spite of the AF control, the user rotates the operation knob 68b to rotate the pinion 58 in an appropriate direction to thereby obtain an in focus object image.

For instance, if the automatic level 10 is used in a dry area and the convergent point of the light in the beam splitting optical system is located between the points P1 and P3 in FIG. 16, the pinion 58 is rotated in the "dry" direction. Namely, the operation knob 68b is rotated from a reference position M=3 towards M=0. Consequently, the sensor 21' is moved in the left hand direction of FIG. 16 by an amount corresponding to the value of M, through the pinion 58 and the rack 61a. This will be discussed in more detail below with reference to FIG. 7. Namely, the light received by the line sensors 21d and 21e after passing through the convergent point Pc, at the outer light receiving portions thereof before the adjustment is carried out, is received by the line sensors 21d and 21e at the inner light receiving portions thereof after the adjustment is completed, owing to the change in the relative positional relationship between the line sensors 21d, 21e and the convergent point Pc. This adjustment corresponds to the movement of the convergent point P3 toward the equivalent surface 14A in FIG. 16.

Conversely, if the automatic level 10 is used in a moist region and the convergent point of the light in the beam splitting optical system is located between the points P1 and P2 in FIG. 16, the pinion 58 is rotated in the "moist" direction. Namely, the operation knob 68b is rotated from the reference position M=3 towards M=7. Consequently, the sensor 21' is moved in the right hand direction of FIG. 16 by an amount corresponding to the value of M. This will be discussed in more detail below with reference to FIG. 7. Namely, the light received by the line sensors 21d and 21e after passing through the convergent point Pc, at the inner light receiving portions thereof before the adjustment is carried out, is received by the line sensors 21d and 21e at the outer light receiving portions thereof after the adjustment is completed, owing to the change in the relative positional relationship between the line sensors 21d, 21e and the convergent point Pc. This adjustment corresponds to the movement of the convergent point P2 toward the equivalent surface 14A in FIG. 16. The user repeatedly effects the above-mentioned operations while observing the image through the eyepiece 15 until he or she visually recognizes that the image is in focus. Thus, the AF control is effected so that the user can always view the focused image of the object to be sighted under the current environmental conditions.

Figure 19:
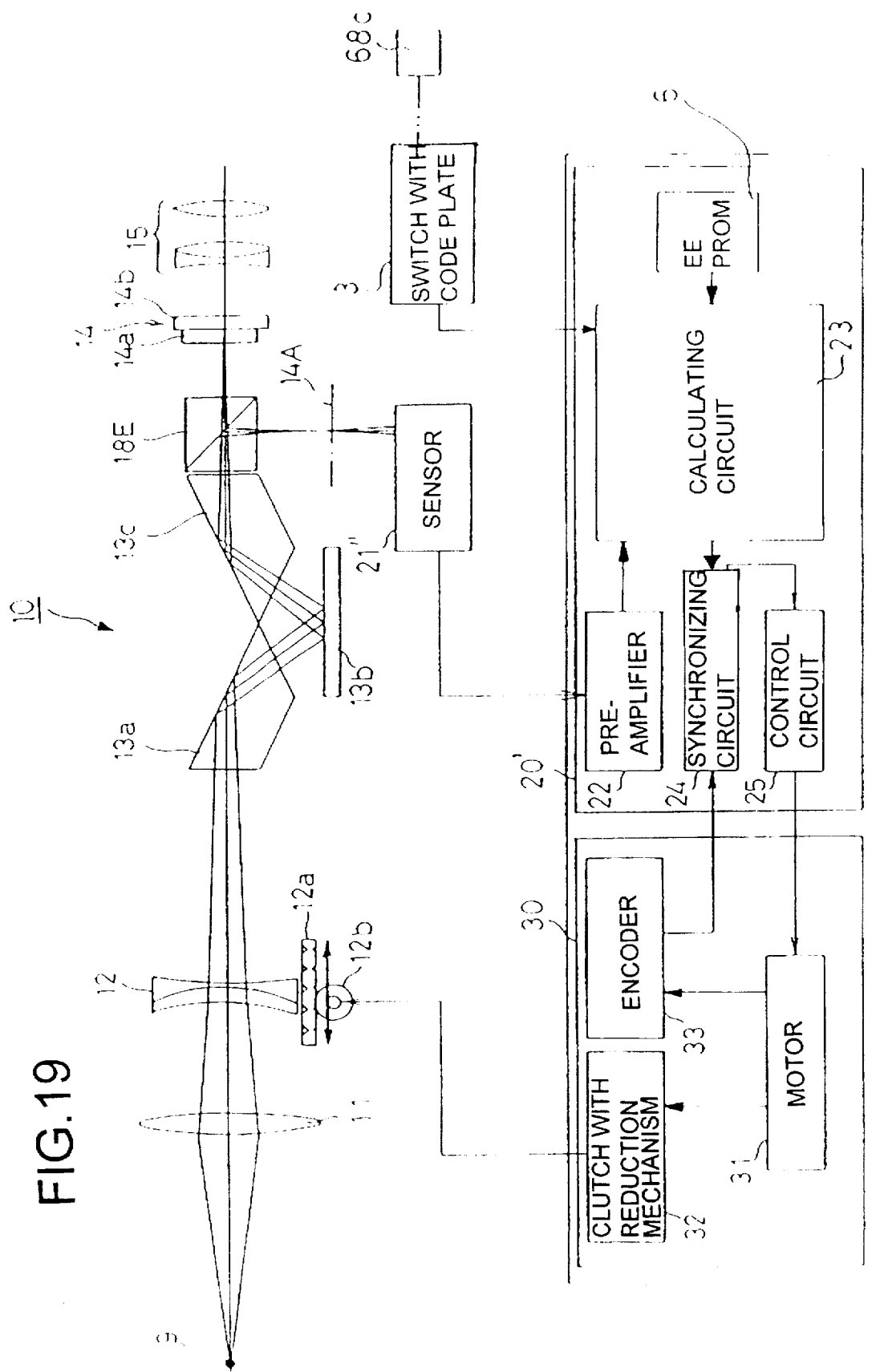
FIG. 19 is a schematic view of an automatic level having an electrical user offset function, according to an aspect of the present invention.
Figure 20:
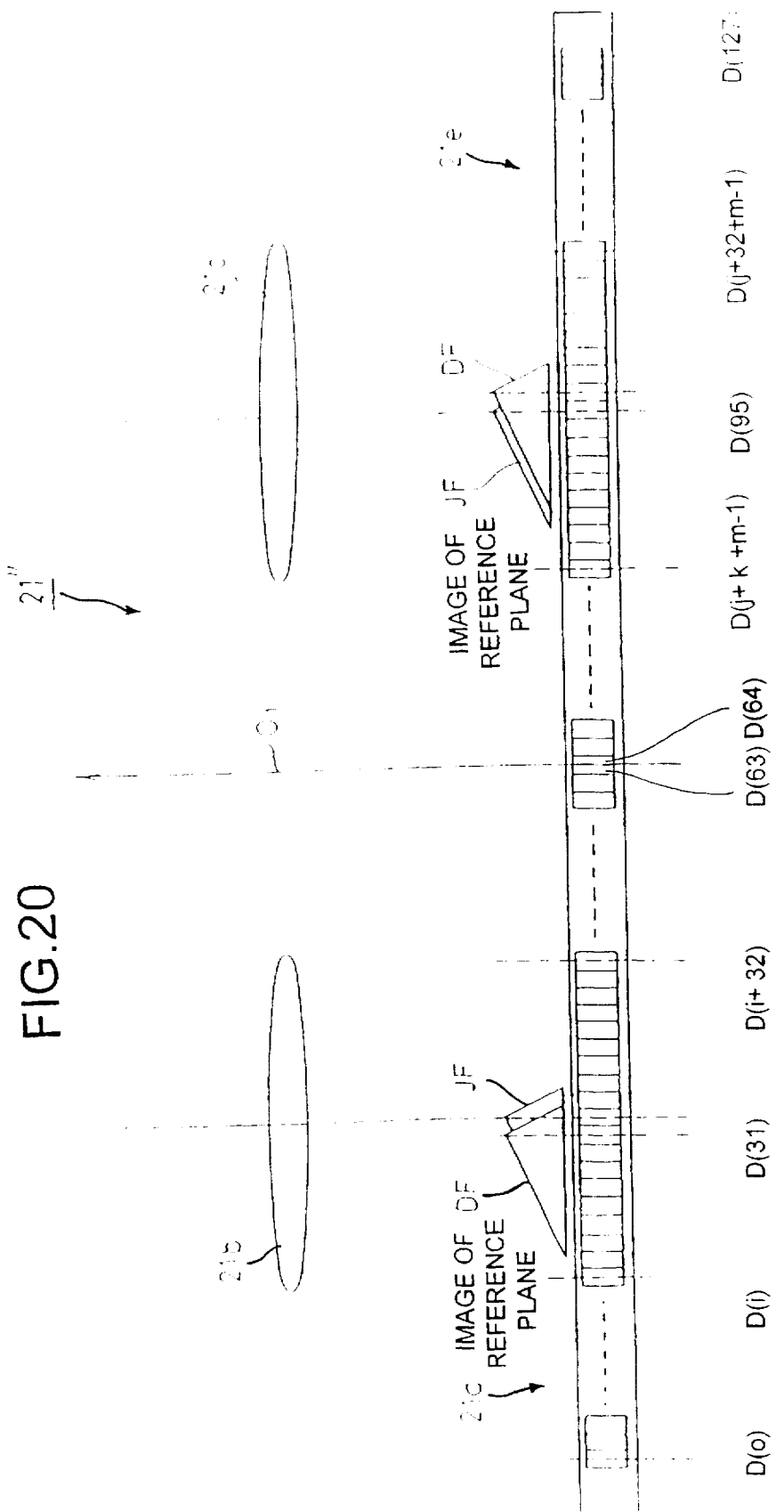
FIG. 20 is a schematic view of light receiving elements of a line sensor to be selected in the optical arrangement shown in FIG. 19.

The following discussion will be addressed to an embodiment in which the user offset function is realized in accordance with an electrical process (see FIGS. 19 and 20). For example, if the radius of curvature of the separator lenses 21b, 21c shown in FIG. 7 changes due to a change in the environment, such as a change in humidity, the center addresses of a reference area (first reference area) and a comparative area (second reference area) change in a phase difference detection system using a line sensor to detect the focus. Hence it is impossible to obtain the focused state at the same address as the initial address of the system. To solve this, in the embodiment illustrated in FIGS. 19 and 20, correction data corresponding to the focus deviation (amount of defocus), which is caused by a variation in the environment, is prepared in advance. In accordance with the correction data the focus is electrically adjusted without shifting either line sensor 21d or 21e as if the line sensors 21d and 21e indicated by the solid lines in FIG. 7 were moved to the respective positions indicated by the phantom lines (two-dotted and dashed line) with respect to the equivalent surface 14A in FIG. 7.

Specifically, in the embodiment of FIGS. 19 and 20, the correction data (user offset data) corresponding to the focus deviation (amount of defocus) is prepared in advance, and is supplied to a calculating circuit 23 through a switch 3 having a code plate incorporated therein to add the correction data to the calculated data obtained when there is no variation in the environment. Accordingly, the switch 3 and the calculating circuit 23 constitute the correcting device. To correct the optical positional deviation between the focusing plate 14 and the equivalent surface 14A, the position (i.e., the reference area of first reference area) of a group of light receiving elements which constitute the line sensor 21d in FIG. 20 is fixed and the position (i.e., the comparative reference area or second reference area) of a group of light receiving elements that constitute the line sensor 21e is modified to vary the center address thereof. Namely the center addresses of the reference area and the comparative area are determined and fixed in accordance with the system initial value supplied from an EEPROM 6. To produce a variable parameter from the fixed center address of the comparative area, an integer m is added to the address of the comparative area. Thus, the difference in the output of the defocused image in each area is produced by varying the value of the integer m to calculate an optional H(m). Consequently, the accurate movement of the focusing lens 12 to an in-focus position can be obtained by an interpolation operation.

To this end, a control system (controller) includes the calculating circuit 23 and the EEPROM 6 in the focus detecting system 20', in addition to the components of the control circuit shown in FIG. 1. The calculating circuit 23 is connected to the switch 3 having a code plate incorporated therein, which is actuated by the operation of the operation knob (operating portion) 68c. The code plate-incorporated switch 3, which is initialized when the operation knob (dial) 68c points to the mark "0", is successively set at "−50", "−100", "−150", (µm/div) when the operation knob 68c is rotated in one direction. Similar, when the operation knob 68c is rotated in another direction, the switch 3 is successively set at "+50", "+100", "+150"(µm/div). The code plate-incorporated switch 3 sends the user offset signal representing the scale of the dial which varies in accordance with the rotation of the operation knob 68c, to the calculating circuit 23. The EEPROM 6 supplies the initial set value of the system to the arithmetic operation circuit 23, regardless of the presence or absence of the user offset data.

The sensor 21", which constitutes a part of the focus detecting system 20', is comprised of a pair of separator lenses 21b, 21c which are spaced at a distance equal to the base length, and a pair of line sensors 21d, 21e on which the images of an object to be viewed are formed by the corresponding separator lenses 21b and 21c. The focus detecting system 20' detects the deviation (amount of defocus) of the convergent point with respect to the equivalent surface 14A, caused by the sighting optical system having the sighting lens 11 and the focusing lens 12, based on the reference output (first reference output) of the reference area (first reference area) of the line sensor 21d and the comparative output (second reference output) of the comparative area (second reference area) of the line sensor 21e, using a phase difference detection system, to thereby detect the in-focus state, out of focus state, front focus state, and rear focus state.

In FIG. 19, when the code plate-incorporated switch 3 indicates "0" at the initial position in which there is no operation of the knob 68c (i.e., the user offset data is zero), the arithmetic operation circuit 23 calculates the deviation of the convergent point with respect to the equivalent surface 14A, caused by the sighting optical system, based on the defocus signal detected by the sensor 21" and supplied through the pre-amplifier 22. The deviation thus obtained is converted into a number of pulses by the encoder 33 and passes through the synchronizing circuit 24, before then being supplied to the control circuit 25.

For instance, if the switch 3, having a built-in code plate, indicates "−50" or "+50" (µm/div), the deviation when the user offset data is zero is calculated by the calculating circuit 23. Thereafter, the user offset data corresponding to "−50" or "+50" (µm/div) is added to the deviation thus obtained in the synchronizing circuit 24. The data is then converted into pulse signals by the encoder 30 and supplied to the control circuit 25. Consequently, the motor 31 is driven by the controller 25 to move the focusing lens 12 in the optical axis direction until the number of pulses from the encoder 33 upon focusing is identical to the number of pulses obtained through the synchronizing circuit 24. At this moment, the sensor 21", which detects the focal point which varies in accordance with the movement of the focusing lens 12 judges that an in-focus state is established at the time the number of pulses counted by the encoder becomes identical to the calculated number of pulses obtained through the synchronizing circuit 24, based on the user offset data corresponding to "−50" or "+50" (µm/div), input from the code plate-incorporated switch 3, even if the focal point (convergent point) of the sighting optical system is deviated from the equivalent surface 14A.

Namely, although it is impossible for a user to judge whether the focus is the front focus or the rear focus only by observation through the eyepiece 15, a user who actuates the operation knob 68c until he or she recognizes that the image is in focus, can view the focused image through the eyepiece 15 while the focal point of the sensor 21", which varies depending on the environment, is within a negligible error limit of about 50 µm. Thus, the viewer can always view a focused clear image of a sighted object, regardless of the environmental conditions.

The groups of the light receiving elements of the line sensors 21d and 21e are selected as follows (FIG. 20). The line sensors 21d and 21e are obtained by splitting, into two, an array of 128 light receiving elements (pixels), at the center of the array. Consequently, the line sensors 21d and 21e each have an array of identical 64 light receiving elements (pixels) to cover the maximum angle of view of the sighting optical system. The line sensors 21d and 21e generate sub-sets of signals for different sizes of light receiving areas corresponding to different angles of view.

In the arrangement shown in FIG. 20, the positions of the light receiving element groups (the reference area or the first reference area and the comparative area or the second reference area) of the line sensors 21d and 21e to obtain the sub-sets of signals are determined by the calculating circuit 23 in accordance with the user offset data supplied thereto from the code plate-incorporated switch 3. Each of the line sensors 21d and 21e has 64 light receiving elements from which 32 pixels (light receiving elements) are selected in combination to define the reference area or the comparative area (second reference area). Note that in FIG. 20, the center between the reference area and the comparative area (i.e., the center between the addresses 63 and 64) is identical to the optical axis O1 of the beam splitting optical system.

The addresses 0 through 63 of the line sensor 21d can be used and the addresses 64 through 127 of the line sensor 21e can be used, respectively. In the initial position in which no user offset data is input, the two areas of the line sensors 21d and 21e, each defined by the 32 pixels, located in the symmetrical arrangement with respect to the optical axis O1 correspond to the reference area and the comparative area (second reference area), respectively.

Assuming that the set index of the light receiving elements to be selected to define the reference area, i.e., the index to set the pixel address of the reference area is "i"; the set index of the light receiving elements to be selected to define the comparative area (second reference area), i.e., the index to set the pixel address of the comparative area is "j"; the index to designate the same number of pixels (light receiving elements) in the corresponding reference area and comparative area is "k"; and the slide-index of the pixel address to set the comparative area is "m". The reference area setting index "i" and the comparative area setting index "j" are input in advance to the EEPROM 6 as initial values of the system, and a similar pixel designating index "k" is necessary for the interpolation. The indexes "i", "j", and "k" have no direct relation to the user offset function.

The automatic focusing for the object to be sighted, in the form of a scalene triangle in FIG. 20, is effected as follows. In FIG. 20, the images of the scalene triangle (object to be sighted) are formed in the reference area of the line sensor 21d and the comparative area (second reference area) of the line sensor 21e by the separator lenses 21b and 21c, respectively. The image of the scalene triangle, indicated at JF is in focus, and the image of the scalene triangle, indicated at DF is out of focus, respectively.

It is possible to judge the focus state of the image of the scalene triangle, i.e., whether the image is at the front focus or rear focus, in accordance with the value of the slide-index "m". The value of the slide-index "m" to give the minimum value of H(m) can be obtained by the following equation (1) for each of the values of m1, m2 and m3.

$$H(m) = \sum_{k=0}^{n} D(i+k) - D(j+k+m-1) \quad (1)$$

where D represents the pixel output, and

The accuracy in the calculation using the formula (1) is in the order of one pixel at most. To increase the accuracy of the focusing operation, the interpolation is effected. Namely, it is assumed that the values of the equation (1) for m1, m2, and m3 are H(m1), H(m2) and H(m3), respectively. Xm is obtained by the interpolation operation, relying upon the following formulae (2) and (3):

$$Xm = \{(H(m1) - H(m3))/(H(m1) - H(m2))\}/2 \quad (2)$$

wherein, $H(m1) \geq H(m3)$ $$Xm = \{(H(m3) - H(m1))/(H(m3) - H(m2))\}/2 \quad (3)$$

wherein, $H(m1) < H(m3)$

The value of "Xm+m2" represents the focus deviation when the user offset data is zero. Also, the value of "m1−m2=m2−m3" represents one pitch of the displacement of the line sensors 21d and 21e. Optional distance data Xmu upon manual offset by a user (user offset) is obtained by the following equation (4):

$$Xmu = Xm + m2 + U.0 \quad (4)$$

wherein "U.0" designates the user offset data (μm/div).

The code plate-incorporated switch 3 shown in FIG. 19 operates based on the principle mentioned above.

In the embodiments illustrated in FIGS. 10 through 15, FIGS. 16 through 18, and FIGS. 19 and 20, if the operator rotates the operation knob 68a (68b or 68c) while observing the eyepiece 15 until the focused state is obtained, focus can be correctly adjusted in connection with not only external factors, such as moisture, but also the state of the user's eyes. It is possible to provide the operation knob 68a (68b, 68c) on any portions other than the battery box 69, such as the lens barrel or the outer surface portion of the apparatus body, etc.

As can be understood from the above discussion, according to the present invention, not only can the time necessary to adjust the focus in the inner focus type telescope be shortened, but also the focusing operation can be automatized. Moreover, the automatic focusing operation can be appropriately carried out, regardless of the external factors upon measurement, such as moisture, so that an image of an object to be sighted can be always viewed in a focused state.

What is claimed is:

1. A telescope comprising:

a sighting objective lens, a focusing lens, a horizon compensating optical system, and a focal plane on which an object image is formed by said sighting objective lens and said focusing lens, arranged in this order from an object side, said horizon compensating optical system comprises a first compensating prism, a compensating mirror, and a second compensating prism;

a position of said focusing lens being adjustable to form the object image on the focal plane in accordance with a distance of an object to be sighted;

a beam splitting optical system provided in an optical path between said horizon compensating optical system and the focal plane to split the optical path of light incident on the beam splitting optical system, said beam splitting optical system comprises a beam splitting element which is adhered to the light emission surface of the second compensating prism;

a surface optically equivalent to the focal plane, provided in said beam splitting optical path;

a correcting system that corrects an optical positional deviation between the focal plane and the optically equivalent surface; and a focus detecting system which detects the state of focus at the optically equivalent surface, said focus detecting system comprising a pair of reimaging lenses spaced at a base length distance, and a pair of line sensors in which object images are formed by said reimaging lenses, one of said line sensors being provided with a first reference area to obtain a first reference output, and the other line sensor being provided with a second reference area to obtain a second reference output, so that a deviation of the light conversion point of the sighting optical system, comprising said sighting objective lens and said focusing lens, from the optically equivalent surface, can be detected by a phase difference detection method, based upon said reference outputs.

2. The telescope according to claim 1, further comprising a driving system for driving said focusing lens in accordance with an output of said focus detecting system.

3. The telescope according to claim 1, further comprising mode switching system that selects one of an autofocus mode in which said focusing lens is driven in accordance with an output of said focus detecting system, and a manual mode in which said focusing lens is manually driven regardless of the output of said focus detecting system.

4. The telescope according to claim 1, wherein said correcting system comprises an adjusting optical member which moves a light convergent point of said beam splitting optical system onto the optically equivalent surface.

5. The telescope according to claim 4, wherein said adjusting optical member comprises a plurality of transparent plane-parallel plates having gradually differing thicknesses, that are selectively brought into the optical path of said beam splitting optical system.

6. The telescope according to claim 5, wherein the adjusting optical member is rotatably supported and is provided, on the portion surrounding the center of rotation thereof, with said transparent plane-parallel plates spaced at an equi-angular distance.

7. The telescope according to claim 6, further comprising a battery box in which a battery is received in a liquid-tight fashion, said battery box being provided with an operating portion to rotate said adjusting optical member.

8. The telescope according to claim 1, further comprising an eyepiece through which the object image formed on the focal plane is viewed.

9. A telescope comprising:

a sighting objective lens, a focusing lens, a horizon compensating optical system, and a focal plane on which an object image is formed by said sighting objective lens and said focusing lens, arranged in this order from an object side;

a position of said focusing lens being adjustable to form the object image on the focal plane in accordance with a distance of an object to be sighted;

a beam splitting optical system provided in an optical path between said sighting objective lens and the focal plane to split the optical path;

a surface optically equivalent to the focal plane, provided in said beam splitting optical path;

a correcting system that corrects an optical positional deviation between the focal plane and the optically equivalent surface, said correcting system comprising a movement adjusting system that moves the focus detecting system relative to the optically equivalent surface;

a focus detecting system which detects the state of focus at the optically equivalent surface, said focus detecting system comprising a pair of reimaging lenses spaced at a base length distance, and a pair of line sensors in which object images are formed by said reimaging lenses, one of said line sensors being provided with a first reference area to obtain a first reference output, and the other line sensor being provided with a second reference area to obtain a second reference output, so that a deviation of the light conversion point of the sighting optical system, comprising said sighting objective lens and said focusing lens, from the optically equivalent surface, can be detected by a phase difference detection method, based upon said reference outputs; and a battery box in which a battery is received in a liquid-tight fashion, said battery box including an operating portion that operates said correcting system, said operating portion provided with a manually actuatable operation knob, and a dial which is positioned about the operation knob, said dial indicating successive displacements of the focus detecting system depending on an external condition including moisture, upon measurement.

10. The telescope according to claim 9, wherein said beam splitting optical system is provided between said horizon compensating optical system and the focal plane.

11. The telescope according to claim 10, wherein said horizon compensating optical system comprises a first compensating prism, a compensating mirror, and a second compensating prism.

12. The telescope according to claim 11, wherein said beam splitting optical system comprises a beam splitting element which is adhered to one of the first compensating prism and the second compensating prism.

13. The telescope according to claim 12, wherein said beam splitting element is adhered to a light emission surface of said second compensating prism.

14. A telescope comprising:

a sighting objective lens, a focusing lens, a horizon compensating optical system, and a focal plane on which an object image is formed by said sighting objective lens and said focusing lens, arranged in this order from an object side, a position of said focusing lens being adjustable to form said object image on said focal plane in accordance with a distance of an object to be sighted;

a beam splitter, provided in an optical path between said sighting objective lens and said focal plane, for reflecting part of a beam of light incident on said beam splitter while transmitting a remaining part of said beam of light;

a surface optically equivalent to said focal plane, provided in a path of said reflected part of said beam of light;

a focus detecting system for detecting the state of focus at said optically equivalent surface, said focus detecting system comprising a pair of reimaging lenses spaced at a base length distance, and a pair of line sensors in which object images are formed by said reimaging lenses, one of said line sensors being provided with a first reference area to obtain a first reference output, and the other line sensor being provided with a second reference area to obtain a second reference output, so that a deviation of the light conversion point of a sighting optical system, comprising said sighting objective lens and said focusing lens, from said optically equivalent surface, can be detected by a phase-difference detection method, based upon said reference outputs; and a correcting system for correcting an optical positional deviation between said focal plane and said optically equivalent surface, said correcting system comprising a system that eliminates a variation in said deviation which occurs due to a variation in at least one of temperature and humidity.

15. The telescope according to claim 14, wherein said eliminating system comprises a device that shifts a light conversion point of said beam splitter in said path of said reflected part of said beam of light to said optically equivalent surface.

16. The telescope according to claim 15, wherein said shift device comprises a plurality of transparent plane-parallel plates having incrementally differing thicknesses, and that are selectively brought into said path of said reflected part of said beam of light.

17. The telescope according to claim 16, wherein said shift device comprises a rotatable member mounted for rotation about a rotational center, said rotatable member being provided with said plurality of transparent plane-parallel plates positioned about said rotational center so that any one of said plurality of transparent plane-parallel plates can be selectively brought into said path of said reflected part of said beam of light by rotating said rotatable member.

18. The telescope according to claim 14, wherein said eliminating system comprises a mechanism that shifts said pair of line sensors along an optical path thereof.

19. The telescope according to claim 14, wherein said eliminating system comprises a system that selects a group of light receiving elements which define said second reference area from a large number of light receiving elements comprising one of said pair of line sensors, said group comprises less than all of said light receiving elements, while fixing a group of light receiving elements which define said first reference area selected from a large number of light receiving elements comprising the other of said pair of line sensors, to thereby vary the center of said second reference area.

20. The telescope according to claim 19, wherein said selecting system comprises a switch having a code plate.

21. The telescope according to claim 14, wherein said eliminating system comprises a switch having a code plate that supplies correction data to said focus detecting system to eliminate said variation in said deviation.

22. The telescope according to claim 14, further comprising a battery box in which a battery is received in a liquid-tight fashion, said battery box being provided therein with an operating portion to rotate said adjusting optical member.

23. The telescope according to claim 21, wherein said operating portion is provided with an operation knob which can be manually actuated, and a dial provided about the operation knob to represent the successive displacements of the focus detecting system depending on external conditions including moisture, upon measurement.

24. The telescope according to claim 14, further comprising an eyepiece through which the object image formed on the focal plane is viewed.

25. A telescope comprising:

a sighting objective lens, a focusing lens, a horizon compensating optical system, and a focal plane on which an object image is formed by said sighting objective lens and said focusing lens, arranged in this order from an object side;

a position of said focusing lens being adjustable to form the object image on the focal plane in accordance with a distance of an object to be sighted;

a beam splitting optical system provided in an optical path between said sighting objective lens and the focal plane to split the optical path of light incident on the beam splitting optical system;

a surface optically equivalent to the focal plane, provided in said beam splitting optical path;

a correcting system that corrects an optical positional deviation between the focal plane and the optically equivalent surface, said correcting system selects a group of light receiving elements which define said second reference area from a large number of light receiving elements comprising one of said pair of line sensors, said group comprising less than all of said light receiving elements, while fixing a group of light receiving elements which define said first reference area selected from among a large number of light receiving elements comprising the other of said pair of line sensors, to thereby vary the center of said second reference area;

a focus detecting system which detects the state of focus at the optically equivalent surface, said focus detecting system comprising a pair of reimaging lenses spaced at a base length distance, and a pair of line sensors in which object images are formed by said reimaging lenses, one of said line sensors being provided with a first reference area to obtain a first reference output, and the other line sensor being provided with a second reference area to obtain a second reference output, so that a deviation of the light conversion point of the sighting optical system, comprising said sighting objective lens and said focusing lens, from the optically equivalent surface, can be detected by a phase difference detection method, based upon said reference outputs; and a battery box in which a battery is received in a liquid-tight fashion, said battery box including an operating portion thatactuates the correcting system.

* * * * *

UNITED STATES PATENT AND TRADEMARK OFFICE
CERTIFICATE OF CORRECTION

PATENT NO.    : 5,796,517
DATED         : August 18, 1998
INVENTOR(S)   : Takayuki SENSUI et al.

It is certified that error appears in the above-identified patent and that said Letters Patent is hereby corrected as shown below:

At column 19, line 45 (claim 22, line 3) delete "therein".

Signed and Sealed this

Sixteenth Day of November, 1999

Attest:

Q. TODD DICKINSON

*Attesting Officer*    *Acting Commissioner of Patents and Trademarks*